(12) United States Patent
Goldberg

(10) Patent No.: US 7,683,834 B2
(45) Date of Patent: *Mar. 23, 2010

(54) UNDULATING TRANSMIT PATTERNS FOR MULTIPLE SIMULTANEOUS TRANSMITTERS TO SUPPORT SIGNAL SEPARATION AT A RECEIVER

(75) Inventor: Steven J. Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/612,818

(22) Filed: Dec. 19, 2006

(65) Prior Publication Data

US 2007/0153744 A1   Jul. 5, 2007

Related U.S. Application Data

(63) Continuation-in-part of application No. 11/233,316, filed on Sep. 22, 2005, now Pat. No. 7,190,308.

(60) Provisional application No. 60/612,546, filed on Sep. 23, 2004, provisional application No. 60/612,435, filed on Sep. 23, 2004, provisional application No. 60/612,433, filed on Sep. 23, 2004, provisional application No. 60/612,550, filed on Sep. 23, 2004, provisional application No. 60/612,632, filed on Sep. 23, 2004, provisional application No. 60/612,548, filed on Sep. 23, 2004, provisional application No. 60/612,471, filed on Sep. 23, 2004, provisional application No. 60/612,551, filed on Sep. 23, 2004, provisional application No. 60/612,469, filed on Sep. 23, 2004, provisional application No. 60/612,547, filed on Sep. 23, 2004, provisional application No. 60/615,338, filed on Oct. 1, 2004, provisional application No. 60/615,260, filed on Oct. 1, 2004, provisional application No. 60/620,775, filed on Oct. 20, 2004, provisional application No. 60/620,776, filed on Oct. 20, 2004, provisional application No. 60/620,862, filed on Oct. 20, 2004, provisional application No. 60/621,113, filed on Oct. 22, 2004, provisional application No. 60/639,223, filed on Dec. 23, 2004.

(51) Int. Cl.
*G01S 3/16* (2006.01)
*H01Q 3/00* (2006.01)
(52) U.S. Cl. .................. 342/378; 342/377; 702/190
(58) Field of Classification Search .............. 342/373, 342/377–378, 380, 382–383; 455/103, 105, 455/137–138; 702/190–197, FOR. 164
See application file for complete search history.

(56) References Cited

U.S. PATENT DOCUMENTS

| 6,473,036 B2 | 10/2002 | Proctor, Jr. .................. 342/372 |
| 6,799,170 B2 | 9/2004 | Lee et al. ....................... 706/20 |
| 6,931,362 B2 | 8/2005 | Beadle et al. ............... 702/190 |
| 2003/0072379 A1* | 4/2003 | Ketchum .................... 375/260 |
| 2003/0125040 A1* | 7/2003 | Walton et al. ............... 455/454 |
| 2006/0066482 A1 | 3/2006 | Goldberg .................... 342/378 |

OTHER PUBLICATIONS

A. Dapena, A novel method to recover N sources from N-1 observations and its application to digital communications. Proceedings of the Fifth International Conference on Independent Component Analysis and Blind Signal Separation Lecture Notes in Computer Science, vol. 3195, 2004.*
Schobben et al., Transparent Communication, Proc. Signal Processing Symposium SPS 98, a two-day workshop organized by the IEE Benelux Signal Processing Chapter, p. 171-174, 1998.
Mathis, Nonlinear Functions for Blind Separation and Equalization, dissertation submitted to the Swiss Federal Institute of Technology, Zurich for the degree of Doctor of Technical Sciences, Hartung-Gorre Verlag, Konstanz, p. 58-63, 220-223, Nov. 2001.
Correlation, Wikipedia, http://en.wikipedia.org/wiki/Correlation.
McLaughlin et al., Introducing Higher Order Statistics (HOS) for the Detection of Nonlinearities, http://maths.leeds.ac.uk/applied/news.dir/issue2/hos_intro.html, Sep. 1995.

* cited by examiner

*Primary Examiner*—Thomas H Tarcza

*Assistant Examiner*—Fred H Mull
(74) *Attorney, Agent, or Firm*—Allen, Dyer, Doppelt, Milbrath & Gilchrist, P.A.

(57) ABSTRACT

A communications system includes multiple mobile wireless communications devices transmitting at a same time to a fixed receiver assembly. Each mobile wireless communications device transmits a source signal defined by a respective character set comprising a plurality of symbols. At least one of the symbols in the respective character sets is transmitted at a different power level so that the transmitted source signal from each mobile wireless communications device appears with linearly independent power level time periods. The linearly independent power level time periods are used by the fixed receiver assembly to populate a mixing matrix for signal separation processing.

36 Claims, 13 Drawing Sheets

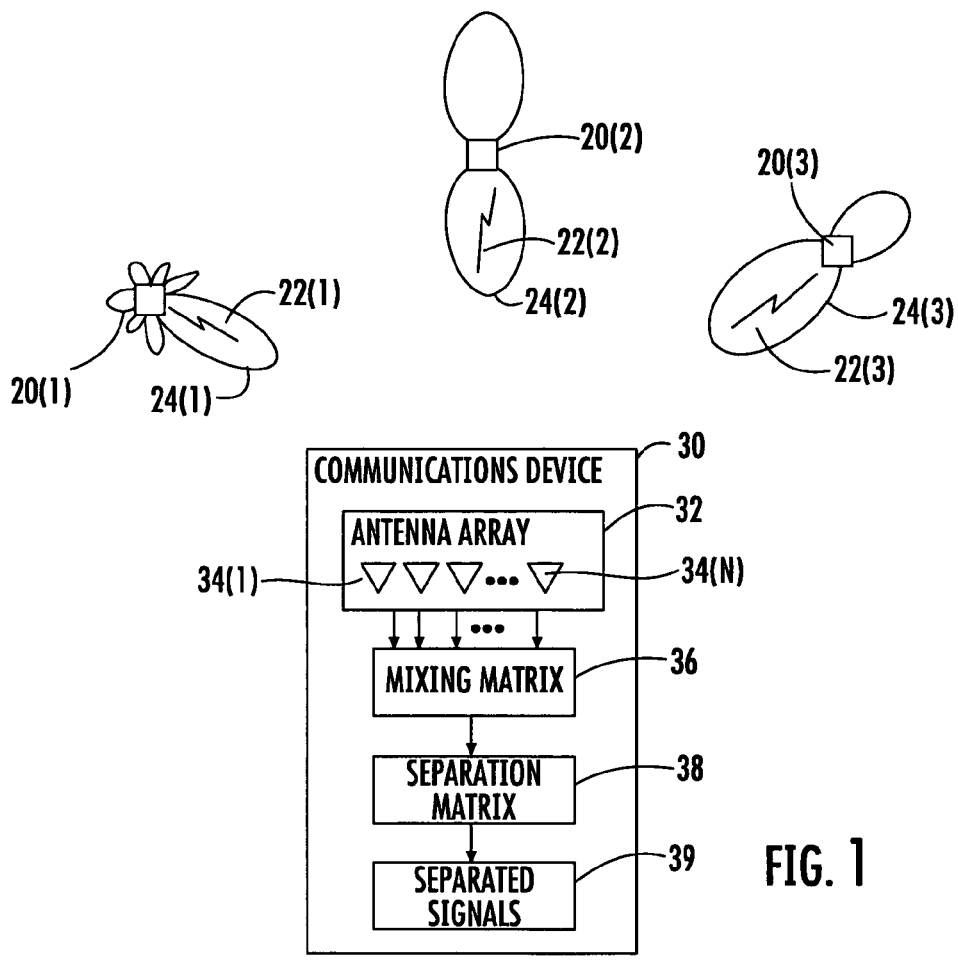
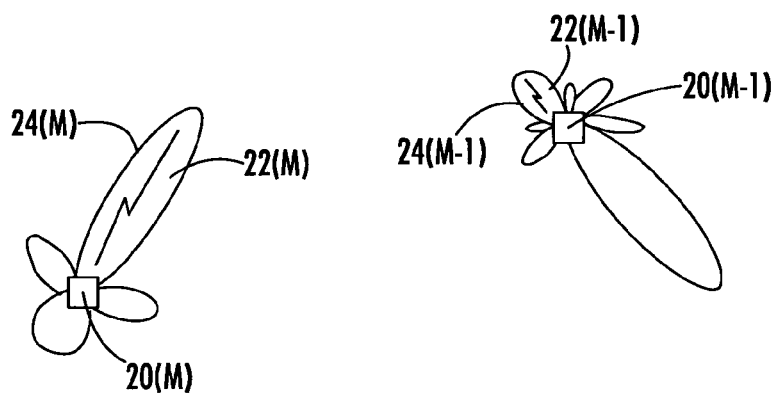
FIG. 1

UNDULATING TRANSMIT PATTERNS FOR MULTIPLE SIMULTANEOUS TRANSMITTERS TO SUPPORT SIGNAL SEPARATION AT A RECEIVER

RELATED APPLICATIONS

The present application is a continuation-in-part of U.S. patent application Ser. No. 11/233,316 filed Sep. 22, 2005 now U.S. Pat. No. 7,190,308 which claims the benefit of U.S. Provisional Application Ser. Nos. 60/639,223 filed Dec. 23, 2004; 60/621,113 filed Oct. 22, 2004; 60/620,775 filed Oct. 20, 2004; 60/620,776 filed Oct. 20, 2004; 60/620,862 filed Oct. 20, 2004; 60/615,338 filed Oct. 1, 2004; 60/615,260 filed Oct. 1, 2004; 60/612,546 filed Sep. 23, 2004; 60/612,435 filed Sep. 23, 2004; 60/612,433 filed Sep. 23, 2004; 60/612,550 filed Sep. 23, 2004; 60/612,632 filed Sep. 23, 2004; 60/612,548 filed Sep. 23, 2004; 60/612,471 filed Sep. 23, 2004; 60/612,551 filed Sep. 23, 2004; 60/612,469 filed Sep. 23, 2004; and 60/612,547 filed Sep. 23, 2004 the entire contents of which are incorporated herein by reference.

FIELD OF THE INVENTION

The present invention relates to the field of signal processing, and more particularly, to separating desired source signals from a mixture of source signals using signal separation techniques.

BACKGROUND OF THE INVENTION

Source signal separation involves recovering source signals from a composite signal, wherein the composite signal includes a mixture of the source signals. Source signal separation includes blind signal separation (BSS), for example. The separation is "blind" because it is often performed with limited information about the signals, the sources of the signals, and the effects that the propagation channel has on the signals.

An example is the familiar "cocktail party" effect when a person at a party is able to separate a single voice from a combination of all the voices in the room. Blind source separation is particularly applicable to cellular and personal wireless communications devices, where many frequency bands have become cluttered with numerous radio frequency emitters, often co-existing in the same spectrum. The problem of co-channel emitters is expected to only worsen in years to come with the development of low power, unlicensed wireless technologies such as Bluetooth and other personal area networks.

Three commonly used blind signal separation techniques are principal component analysis (PCA), independent component analysis (ICA) and singular value decomposition (SVD). PCA involves first and second moment statistics of the source signals, and is used when the signal-to-noise ratios of the source signals are high. Otherwise, ICA is used which involves PCA processing followed by third and fourth moment statistics of the source signals. As an alternative, SVD may be used to separate a source signal from the mixture of source signals based upon their eigenvalues.

Regardless of the blind signal separation technique that is applied, a plurality of sensors is used to receive different mixtures of the source signals from the various signal sources. Each sensor outputs a mixture of the source signals, which is a unique sum of the source signals. In general, both the channel coefficients and the original source signals are unknown to the receiver. The unique sums of signals are used to populate a mixing matrix. The appropriate blind signal separation technique is then applied to the mixing matrix for separating desired source signals from the mixture of source signals.

As an example, U.S. Pat. No. 6,799,170 discloses the separation of an independent source signal from a mixture of source signals using ICA. A plurality of sensors receive the mixture of source signals, and a processor takes samples of the mixture of source signals over time and stores each sample as a data vector to create a data set. Each sensor outputs a mixture of the source signals, which is a unique sum of the source signals. An ICA module performs an independent component analysis of the data vectors to separate an independent source signal from other signals in the mixture of source signals.

The sensors are spatially separated from one another, and the processor generates only one data vector for each respective sensor to create the data set. The '170 patent also discloses that the number of sensors N is equal to or greater than the number of sources M, i.e., $N \geq M$ for populating the data set. A problem with such an implementation is that as the number of sources M increases, then so does the number of sensors N. Small portable communications devices have little available volume for a large number of sensors N, and mounting the sensors on the outside of the communications devices is a problem for the users.

U.S. Pat. No. 6,931,362 discloses another method for separating signals using blind signal separation. The disclosed blind signal separation technique forms a mixing matrix with hybrid matrix-pencil adaptive array weights that minimize the mean squared errors due to both interference emitters and Gaussian noise. The hybrid weights maximize the signal to interference plus noise ratio. As with the '170 patent, the sensors are also spatially separated from one another, and the number of sensors N is equal to or greater than the number of sources M for populating the mixing matrix. Moreover, each sensor provides a single input to the mixing matrix resulting in a larger volume area for a portable communications device.

The rank of the mixing matrix thus determines how many signals can actually be separated. The larger the rank, the more signals that can be separated. A multipath signal is beneficial in that it can be used to populate the mixing matrix, as long as the multipath signal is independent in some measurable characteristic. Multipath occurs when a single data transmission encounters obstacles that cause it to split into multiple versions, each taking a different path to an intended receiver.

However, the symbols within a multipath signal may be time shifted so that when they reach the intended receiver, they may cancel or interfere with other received symbols. Alternatively, multipath may not even exist between the signal source and the intended receiver. As a consequence, the number of linearly independent signal sums received by the intended receiver for both of these cases may not be enough to populate the mixing matrix for signal separation.

SUMMARY OF THE INVENTION

In view of the foregoing background, it is therefore an object of the present invention to generate linearly independent signal sums so that an intended receiver can populate a mixing matrix to a rank size sufficient for signal separation processing.

This and other objects, features, and advantages in accordance with the present invention are provided by a communications system comprising at least J mobile wireless communications devices transmitting at a same time, where $J \geq 2$.

Each mobile wireless communications device transmits a source signal defined by a respective character set comprising a plurality of symbols. At least one of the symbols in the respective character set is transmitted at a different power level so that the transmitted source signals from the at least J mobile wireless communications devices appear with at least $L_1$ to $L_J$ linearly independent power level time periods, where $L_j \geq 1$ with at least one $L_j > 1$.

The term undulation, as used herein, thus refers to transmit pattern contours with varying gains, which may or may not display degrees of symmetry. This is accomplished by at least one of the symbols in the character set being transmitted at a different power level so that the transmitted source signal appears with L linearly independent power level time periods.

A fixed communications device may separate source signals provided by M signal sources, where $M \geq 2$. The J mobile wireless communications devices may provide J of the M source signals including up to $(L_1^* \ldots {}^*L_J)$ linearly independent power level time periods. The fixed communications device may comprise an antenna array comprising N antenna elements for receiving at least N different summations of the M source signals, where $N \geq 1$. A receiver may be coupled to the antenna array for receiving the at least N different summations of the M source signals.

A signal separation processor may be coupled to the receiver for forming a mixing matrix comprising the at least N different summations of the M source signals. The mixing matrix may have a rank equal up to at least $(L_1^* \ldots {}^*L_J)$. The signal separation processor separates desired source signals from the mixing matrix.

As a result of each mobile wireless communications devices generating L linearly independent power level time periods from a single source signal, multiple power level versions of the signal are created so that a corresponding number of multiple signal sums received at the fixed communications device can be used to populate the mixing matrix for signal separation.

The mobile wireless communications devices may use time aligned slots for transmitting the source signals. Each mobile wireless communications device may comprise an internal clock for setting their own timing to correspond with the time aligned slots. Alternatively, the fixed communications device may comprise a transmitter for transmitting a synch signal so that the mobile wireless communications devices can set their own timing to correspond with the time aligned slots.

In creating the linearly independent power level time periods, the amplitude of each symbol in the character set may be constant, with at least two of the symbols being transmitted at different power levels.

The fixed communications device may be part of a base station so that the communications system is configured as a cellular network.

The communications system may further comprise at least one fixed receiver associated with the at least one fixed transmitter, and wherein the wireless communications device may further comprise a mobile transmitter for providing feedback to the at least one fixed transmitter via the at least one fixed receiver on transmission of the at least one symbol in the character set at the different power level. The feedback may comprise adjustment of the power level, and a sequence of the symbols within character sets being transmitted at the different power level.

The signal separation processor may comprise a blind signal separation processor, and separate the desired source signals from the mixing matrix based on at least one of principal component analysis (PCA), independent component analysis (ICA), and single value decomposition (SVD). Alternatively, the signal separation processor may separate the desired source signals from the mixing matrix based on a knowledge based processing signal extraction process.

The antenna array at the receiver may be configured with different antenna configurations. The antenna elements may comprise correlated and/or uncorrelated antenna elements, wherein each element provides a single input to the mixing matrix. Alternatively, a portion of the antenna elements may have different polarizations for populating the mixing matrix.

Enhancements may be made to the antenna configurations so that additional or replacement summations of the source signals are collected to further populate the mixing matrix. Array deflection may be used in which the elevation of the antenna patterns is changed for receiving additional summations of the source signals.

Path selection may be performed so that all of the summations of the source signals used to populate the mixing matrix A have suitable correlation ($1^{st}$ and $2^{nd}$ moments) and/or statistically ($3^{rd}$ and $4^{th}$ moments) independent values. In other words, the incident signals are selectively chosen for receiving new summations of the source signals to replace the summations that are not correlated and/or statistically independent in a suitable way.

Signal splitting for further populating the mixing matrix may be performed. The different summation signals may be split using spreading codes. If a summation signal has k spreading codes, then that particular summation signal may be processed to provide k summation signals associated therewith. The different summation signals may also be split into in-phase (I) and quadrature (Q) components to further populate the mixing matrix. The I and Q components thus act as a multiplier of 2 for the mixing matrix.

Another aspect of the present invention is to a method for operating a communications system as defined above.

BRIEF DESCRIPTION OF THE DRAWINGS

FIG. 1 is a block diagram of a typical operating scenario in which a communications device receives desired and undesired signals from their respective signal sources in accordance with the present invention.

DETAILED DESCRIPTION OF THE PREFERRED EMBODIMENTS

Figure 2:
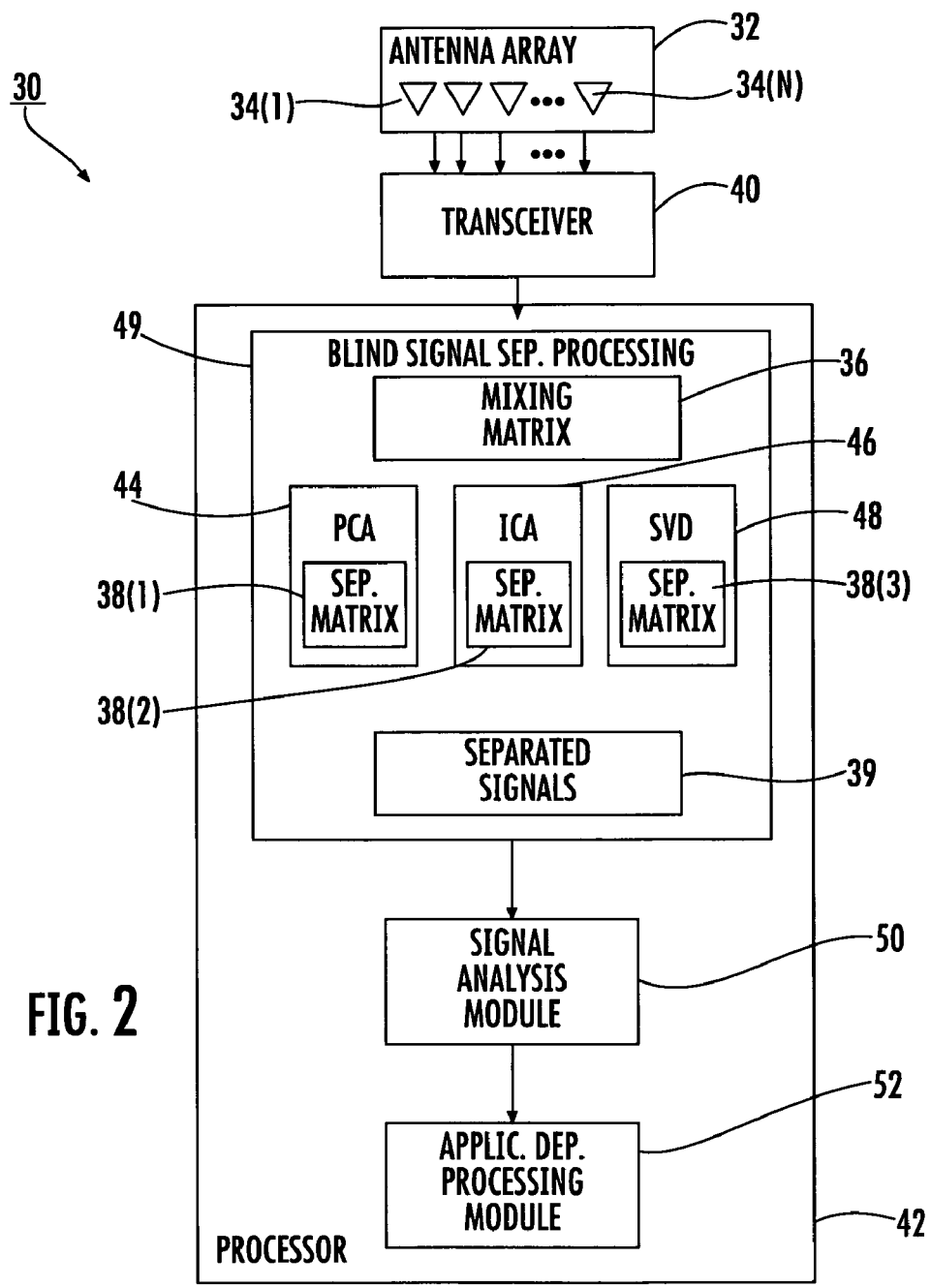
FIG. 2 is a more detailed block diagram of the communications device shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In communications networks there are source signals intended for a specific communications device, and there are source signals intended for other communications devices operating within the same frequency band. When a source signal encounters obstacles that cause it to split into multiple versions, each taking a different path to an intended receiver, multipath occurs. There are also sources of noise which produce signals that are not used for communications, but are received by the communications devices as well.

To facilitate decoding of the source signals of interest, blind signal separation is used to separate the signals received by a communications device. As noted above, the term "blind" refers to the fact that in an ideal case the signals can be separated without any knowledge about the nature of the signals or the transformations that occur due to interactions between the signals and the communication channel. In practical implementations, any knowledge that is available is often exploited. In this case, the signal separation is semi-blind.

Three commonly used techniques that fall under blind signal separation are principal component analysis (PCA), independent component analysis (ICA), and singular value decomposition (SVD). As long as the signals are independent in some measurable characteristic, and if their signal sums are linearly independent from each other, one or more of these blind signal separation techniques may be used to separate independent or desired source signals from a mixture of the source signals. The measurable characteristic is often some combination of the first, second, third or fourth moments of the signals.

PCA whitens the signals, uses first and second moments, and rotates the data set based on correlation properties. If the signal-to-noise ratios of the source signals are high, the signal separation process can stop with PCA.

If the signal-to-noise ratios of the source signals are low, then ICA separates the source signals based on statistical attributes involving the third and fourth moments of the source signals. When the source signals are Gaussian, their third and fourth moments are dependent on the first and second moments, and ICA is capable of separating one Gaussian signal As an alternative to ICA and PCA, SVD separates source signals from the mixture of source signals based upon their eigenvalues.

As an alternative to blind signal separation processing, signal separation processing may be based on a knowledge based processing signal extraction process. The knowledge based signal separation process separates the desired source signals from the mixing matrix based on at least one of a zero forcing (ZF) process, and a minimum mean squared estimation (MMSE) process, for example.

A typical scenario is illustrated in FIG. 1, in which a plurality of signal sources 20 transmit source signals 22. The source signals 22 are transmitted in a direction based upon generated antenna beams 24 associated with each respective signal source 20. The plurality of signal sources 20 include a first signal source 20(1) through an Mth signal source 20(M). Likewise, the respective source signals are referenced 22(1)-22(M) and the corresponding antenna beams are referenced 24(1)-24(M). More straightforward implementations are often utilized in communications networks in the form of omni-directional antenna patterns or directional antenna patterns.

An antenna array 32 for the communications device 3G receives a linear combination (mixture) of the source signals 22 from the signal sources 20. If the source signals 22 reach the antenna array 32 by two or more paths, they then become known as multipath signals. Causes of multipath include atmospheric ducting, ionospheric reflection and refraction, and reflection and refraction from terrestrial objects, such as mountains and buildings.

The antenna array 32 comprises a plurality of antenna elements 34, with each antenna element providing at least one linear combination (mixture) of the source signals 22 from the signal sources 20. The antenna elements 34 include a first antenna element 34(1) through an Nth antenna element 34(N).

The received source signals 22(1)-22(M) are initially formed into a mixing matrix 36. The communications device 30 uses blind signal separation techniques to determine a separation matrix 38 for separating the source signals in the mixing matrix. The separated signals are represented by reference 39.

The communications device 30 jointly extracts the mixture of source signals received by the antenna array 32 by sampling an aggregate or composite of the received source signals without knowledge of their characteristics. The output of each antenna element 34 is modeled as a summation of the source signals 22 after having been convolved with the impulse response of the channel, i.e., the propagation path between the output of a signal source 20 and the output of an antenna element 34 plus additive Gaussian noise.

The communications device 30 for separating source signals provided by the M signal sources 20(1)-20(M) will now be discussed in greater detail with reference to FIG. 2. An antenna array 34 includes N antenna elements 34(1)-34(N) for receiving up to at least N different summations of the M source signals, with N and M being greater than 1. The antenna array 32 is not limited to any particular configuration. The antenna array 32 may include one or more antenna elements 34. The antenna elements 34 may be configured so that the antenna array 32 forms a phased array or switched beam antenna, for example, as will be discussed in greater below.

A transceiver 40 is connected downstream to the antenna array 32 for receiving up to the at least N different summations of the M source signals 22. A processor 42 is downstream to the transceiver 40. Even though the processor 42 is illustrated separate form the transceiver 40, the processor may also be included within the transceiver. The different summations of the M source signals 22 received by the transceiver 40 are used to populate the mixing matrix 36. The mixing matrix 36 is then processed by one or more blind signal separation processing modules 44, 46 and 48 within the processor 42.

The blind signal separation processing modules include a PCA module 44, an ICA module 46 and an SVD module 48. These modules 44, 46 and 48 may be configured as part of a blind signal separation processor 49. The PCA module 44 operates based on the first and second moments of the different summations of the received source signals, whereas the ICA module 46 operates based on the third and fourth moments of the same signals. The SVD module 48 performs signal separation based on the eigenvalues of the different summations of the received source signals.

The correlation processing initially performed by the PCA module 44 determines an initial separation matrix 38(1) for the different summations of the source signals, and the ICA module 46 then determines an enhanced separation matrix 38(2) for separating the source signals in the mixing matrix 36. If the signals are separated by the SVD module 48, a separation matrix 38(3) is also determined for separating the different summations of the received source signals in the mixing matrix 36.

From each respective separation matrix 38(1)-38(3), the separated signals are represented by reference number 39.

The separated signals 39 then undergo signal analysis by a signal analysis module 50 to determine which signals are of interest and which signals are interferers. An application dependent processing module 52 processes the signals output from the signal analysis module 50.

The decision on which signals are of interest may not always involve the final signal to be decoded. For instance, the application may call for identifying interferers and subtracting them from the different summations of the received source signals, and then feeding the reduced signal to a waveform decoder. In this case, the signals of interest are the ones that ultimately end up being rejected.

The information fed to the PCA module 44 is a unique sum of signals $x_j$. It is assumed that N linear mixtures $x_1, \ldots, x_N$ of M independent components are observed:

$$x_1(t) = a_{11}s_1(t) + \cdots a_{1k}s_k(t) + \cdots a_{1M}s_M(t)$$
$$\vdots$$
$$x_j(t) = a_{j1}s_1(t) + \cdots a_{jk}s_k(t) + \cdots a_{jM}s_M(t)$$
$$\vdots$$
$$x_N(t) = a_{N1}s_1(t) + \cdots a_{Nk}s_k(t) + \cdots a_{NM}s_M(t)$$

In general, both the channel coefficients $\alpha_{jk}$ and the original signals $s_k$ are unknown to the transceiver 40. In matrix notation the above set of equations may be compactly written as x=As, where A is the mixing matrix. The statistical model x=As is also known as the ICA model. Traditional techniques try to find the inverse of the channel: s=A⁻x.

The ICA module 46 determines a separation matrix W, and y=W(As)=Wx. The vector y is a subset of s in unknown order with scaling changes. If all the signals are not separable, the more general form would be y=W(As)+Wn=Wx+Wn, where the additional n term is the residual noise due to the unidentifiable sources.

The ICA model is a generative model, which means that it describes how the observed data is generated by a process of mixing the components $s_k$. The independent components are latent variables, meaning that they cannot be directly observed. Also, the mixing matrix A is assumed to be unknown. All that is observed is the random vector x, and A and s are to be estimated based upon x.

The starting point of ICA is the assumption that the components $s_k$ are statistically independent. Moreover, it is assumed that the independent components $s_k$ at most have one with a Gaussian distribution. The one signal with a Gaussian distribution limitation is due to the fact that the third moment of a Gaussian signal is 0, and the forth moment is indistinguishable amongst Gaussian signals.

For simplicity, the unknown mixing matrix A is assumed to be square. Thus, the number of independent components is equal to the number of observed mixtures. However, this assumption can be relaxed at times. As long as the signals $s_k$ are statistically independent in some measurable characteristic, the separation matrix W can be determined.

The rank of the mixing matrix A determines how many signals can actually be separated. For example, a mixing matrix having a rank of 4 means that 4 source signals can be separated. Ideally, the rank of the mixing matrix A should at least be equal to the number of signal sources M. The larger the rank, the more signals that can be separated. As the number of sources M increases, then so does the required number of antenna elements N. The '170 and '362 patents discussed in the background section both disclose that the number of antenna elements N are equal to or greater than the number of signal sources M, i.e., N≧M, otherwise a technique other than blind signal separation is to be used to separate the signals.

An industry standard for creating the linearly independent sums of signals is to use N uncorrelated sensors, i.e., the sensors are spaced at least a wavelength apart from one another. The wavelength is based upon the operating frequency of the communications device 30. The N sensors are uncorrelated in space, but correlated in polarization and in angle. The N uncorrelated sensors provide N sums of linearly independent signals, where each sensor provides a single entry into the mixing matrix A.

Figure 3:
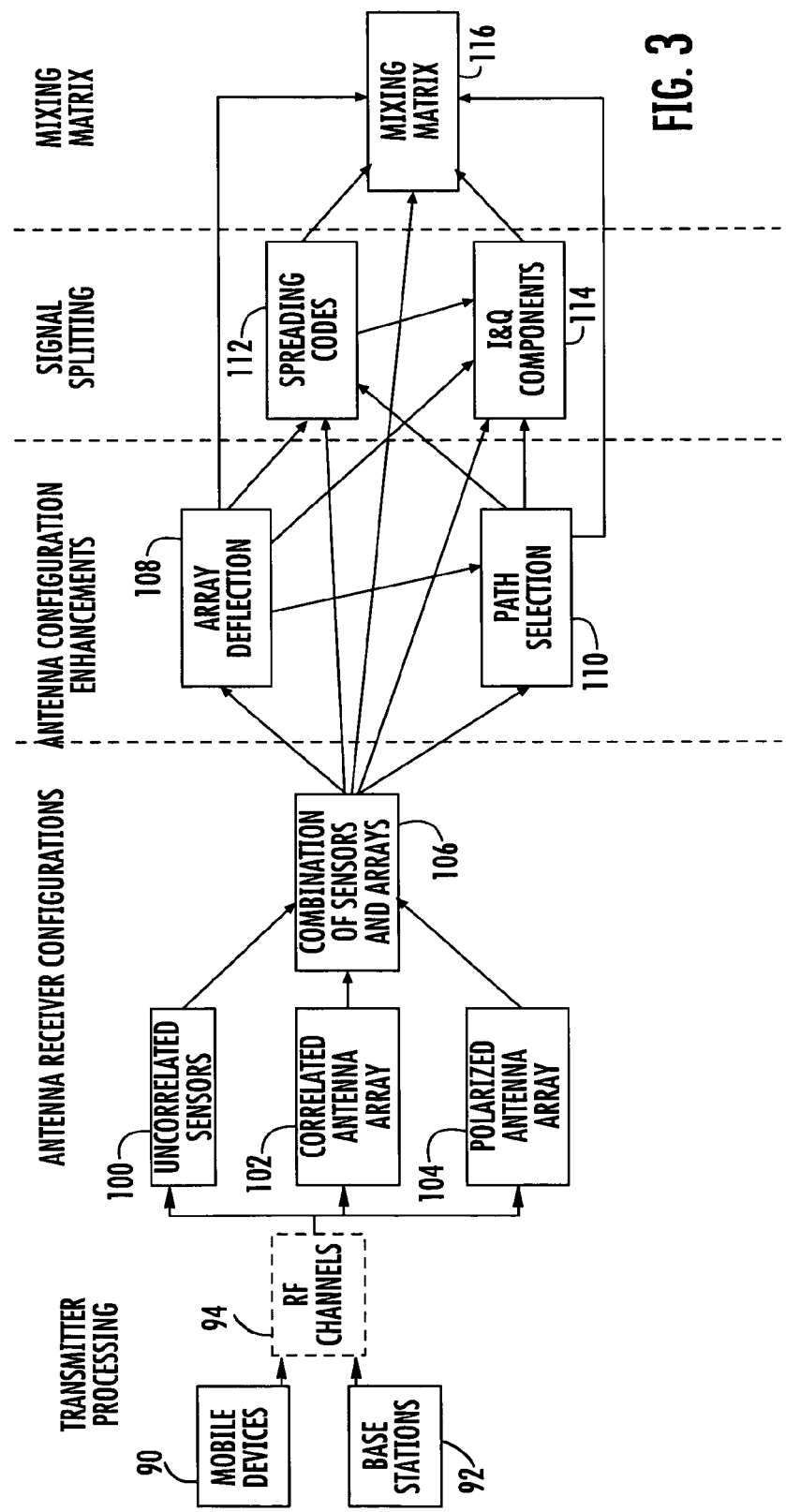
FIG. 3 is a roadmap of the different approaches for creating the linear independent summations of the source signals for the mixing matrix in accordance with the present invention.

A roadmap or outline of the different approaches for creating the linear independent summations of the source signals for the mixing matrix A will initially be discussed with reference to FIG. 3. After a brief introduction, each approach will be discussed in greater detail below.

The first section of the roadmap addresses enhancements that can be made on the transmitter side of the communications link for generating linearly independent signal sums so that an intended receiver can populate its mixing matrix to a rank size sufficient for signal separation processing. Block 90 represents mobile communications devices, and Block 92 represents transmitters at an infrastructure site. Both of these blocks feed into the RF channels (Block 94), which in turn provide the RF signals to the next section of the roadmap, i.e., antenna receiver configurations.

In the second section of the roadmap, Block 100 represents uncorrelated sensors, wherein each sensor provides a single input to the mixing matrix A. Block 102 represents a correlated antenna array, wherein the array provides multiple inputs to populate the mixing matrix A. Block 104 also represents an antenna array, wherein a portion of the antenna elements is correlated and the antenna elements have different polarizations for populating the mixing matrix A. Different combinations of the sensors and antenna arrays addressed by Blocks 100, 102 and 104 may be combined in Block 106 to further populate the mixing matrix in Block 116.

The third section of the roadmap addresses enhancements to the antenna receiver configurations provided in the second section. The enhancements are made so that additional or replacement summations of the source signals are collected to further populate the mixing matrix A. Block 108 involves array deflection in which the elevation of the antenna patterns is changed for receiving additional summations of the source signals. Anyone of the combinations in Block 106 may be used in the array deflection Block 108.

In Block 110, path selection is performed so that all of the summations of the source signals used to populate the mixing matrix A are correlated ($1^{st}$ and $2^{nd}$ moments) and/or statistically ($3^{rd}$ and $4^{th}$ moments) independent. In other words, the incident signals are selectively chosen for receiving new summations of the source signals to replace the summations that are not correlated and/or statistically independent. Block 110 may be fed by anyone of the combinations in Block 106 and 108. Blocks 108 and 110 may be fed directly to the mixing matrix Block 116.

The fourth section of the roadmap addresses signal splitting for further populating the mixing matrix in Block 116. For example, Block 112 splits the different summation signals using spreading codes. If a summation signal has k spreading codes, then that particular summation signal may be processed to provide k summation signals associated therewith. The spreading codes may be applied in combination with the outputs of Blocks 106, 108 and 110. Block 114 splits the different summation signals into in-phase (I) and quadrature (Q) components to further populate the mixing matrix. The I and Q components thus act as a multiplier of 2 for the mixing matrix, and may be applied in combination with the outputs of Blocks 106, 108, 110 and 112.

The final section of the roadmap is the mixing matrix A formed in Block 116. As illustrated in the roadmap, the mixing matrix A may be populated with the different summations of the source signals based on anyone of the above described blocks. An advantage of the antenna array configurations in the second section is that compact antenna arrays may be formed for populating the mixing matrix A. An advantage of the antenna array configurations in the third and fourth sections is that N antenna elements, where N is less than the number M of source signals, can be used to populate the mixing matrix with M or more summations of the source signals.

Figure 4:
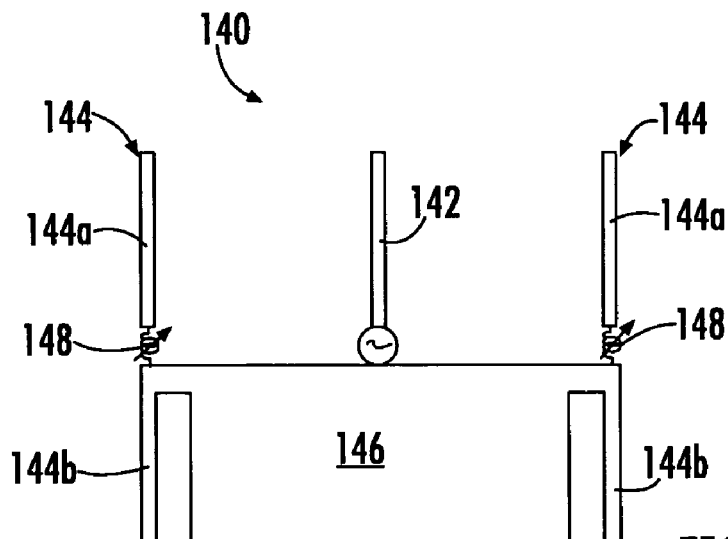
FIG. 4 is a block diagram of the antenna array configured as a switched beam antenna in accordance with the present invention.

In view of the antenna configurations discussed in the roadmap, an antenna array comprising N correlated antenna elements for receiving at least N different summations of the M source signals, with N and M being greater than 1, will be discussed. In one embodiment, the antenna array is a switched beam antenna 140 as illustrated in FIG. 4.

The switched beam antenna array 140 generates a plurality of antenna patterns, including directional antenna patterns and an omni-directional antenna pattern. The switched beam antenna 140 includes an active antenna element 142 and a pair of passive antenna elements 144. The actual number of active and passive antenna elements 142, 144 varies depending on the intended application. Reference is directed to U.S. patent application Ser. No. 11/065,752 for a more detailed discussion on the switched beam antenna array. This patent application is assigned to the current assignee of the present invention, the contents of which are incorporated herein by reference in its entirety.

Each passive antenna element 144 includes an upper half 144a and a lower half 144b. The upper halves 144a of the passive antenna elements 144 are connected to a ground plane 146 through reactive loads 148. The reactive loads 148 are a variable reactance, which is changeable in capacitance to inductance by using varactors, transmission lines or switching. By varying the reactive loads 148, the radiation patterns can be changed. Since there are two passive antenna elements 144, four different antenna patterns can be formed.

Three of the antenna patterns can be used to receive a unique sum of signals $x_j$. The fourth pattern is a linear combination of the other three, so it is not usable as an entry in the mixing matrix A. Consequently, with three antenna elements being utilized, three unique sum of signals $x_j$ are input to the mixing matrix A. An advantage of the switched beam antenna is that by using 3 elements 142 and 144, a mixing matrix of rank 3 can be supported.

Figure 5:
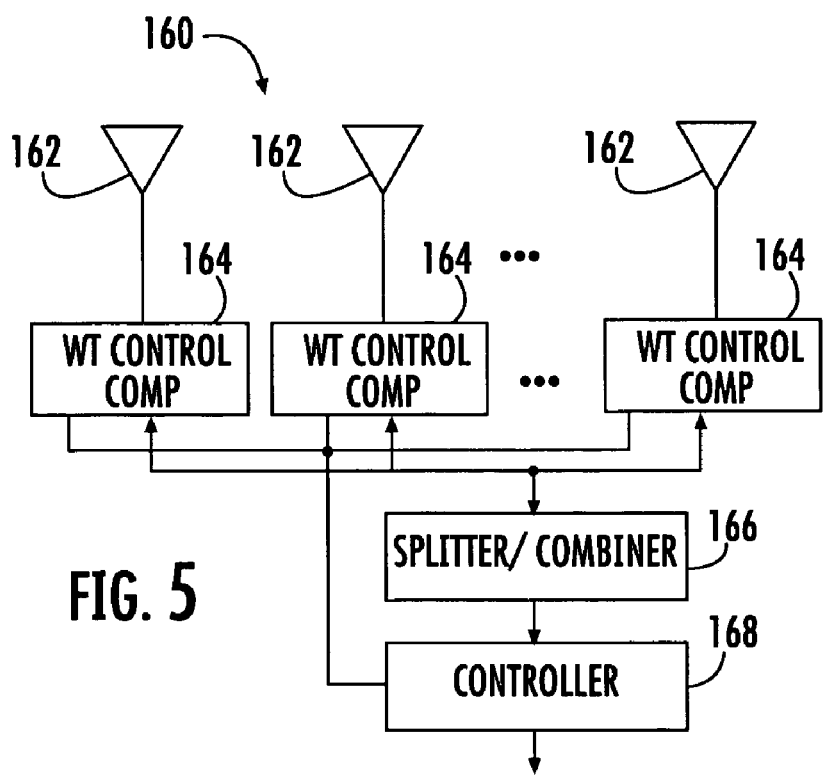
FIG. 5 is a block diagram of the antenna array configured as a phased array in accordance with the present invention.

In another embodiment, the antenna array comprises N correlated active antenna elements so that the antenna array forms a phased array 160, as illustrated in FIG. 5. The phased array 160 comprises a plurality of active antenna elements 162, and a plurality of weight control components 164 coupled to the active antenna elements. The weight control components 164 adjust the amplitude and/or phase of the received signals to form a composite beam.

A splitter/combiner 166 and a controller 168 are connected to the weight control components 164. Reference is directed to U.S. Pat. No. 6,473,036 for a more detailed discussion on the active array 160. This patent is assigned to the current assignee of the present invention, the contents of which are incorporated herein by reference in its entirety.

The number of active elements 162 supports a mixing matrix A having the same rank. Even though the number of sources M is equal to the number of active elements N, i.e., M=N, the active array 100 is compact since the active elements 162 are correlated in space and polarization, as compared to the traditional approach of using uncorrelated antenna elements that are spaced more than a wavelength apart.

In other embodiments, the rank of the mixing matrix may be K, where K<N, so that the blind signal separation processor 49 separates K of the M source signals from the mixing matrix. As will be discussed in greater detail below, N may also be greater than M.

In both the switched beam antenna 140 and the phased array 160, the distance between their respective antenna elements 142, 144 and 162 is set to allow a favorable back to front ratio. This is because the classical use of these antenna arrays is to reject unwanted signals (i.e., back approaching) and intensify wanted signals (i.e., front approaching).

However, for the purpose of building mixing matrices, the goal is create different sums of signals. The signals of interest can actually always be lower than the interferers in this application and still be separated. Because of this significant difference in purpose, the distances between antenna elements need not be of a specific separation.

The antenna elements could be further or closer together, generate patterns with classically 'bad' front to back ratios, and still be quite suitable for mixing matrix usage. If fact, such patterns will often be superior in the blind signal source separation application. The reason being that the use of good front to back ratios requires tracking of the signal directions in order to keep the front pointed at the desired signal and/or the back at interferers. By using patterns which have differences in various directions, but still significant gains, no such tracking of the signals is required.

An antenna beam may be defined as having 3 db points down from a maximum gain point thereof providing for signal rejection in at least one direction of signal approach. Similarly, an antenna pattern may be defined as having substantially no 3 dB points down from a maximum gain point thereof and having no signal rejection in any direction of signal approach.

In many applications this deviation from specific distances between elements can greatly reduce the size of the overall antenna array, In other applications it might actually be desirable to increase the distance between elements to alleviate the tracking problem, but gain some degree of additional signal decorrelation.

Figure 6:
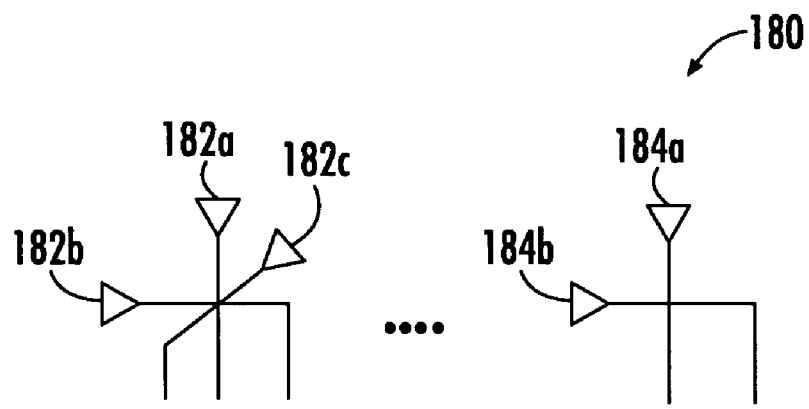
FIG. 6 is a block diagram of the antenna array configured with polarized antenna elements in accordance with the present invention.

In another embodiment, the antenna array 180 comprises N antenna elements for receiving at least N different summations of the M source signals, as illustrated in FIG. 6. At least two of the N antenna elements 182a, 182b are correlated and have different polarizations for receiving at least two of the N different summations of the M source signals, with N and M being greater than 1.

The other antenna elements 184a, 184b in the array 180 may be correlated or uncorrelated with respect to antenna elements 182a, 182b. Even though another pair of polarized antenna elements 184a, 184b are illustrated, these elements may instead have the same polarization. Moreover, these elements may also be uncorrelated with one another.

The different polarizations for antenna elements 182a, 182b may be orthogonal to one another. In another configuration, the antenna elements 182a, 182b include a third element 182c so that tri-polarization is supported for receiving 3 different summations of the M source signals.

Figure 7:
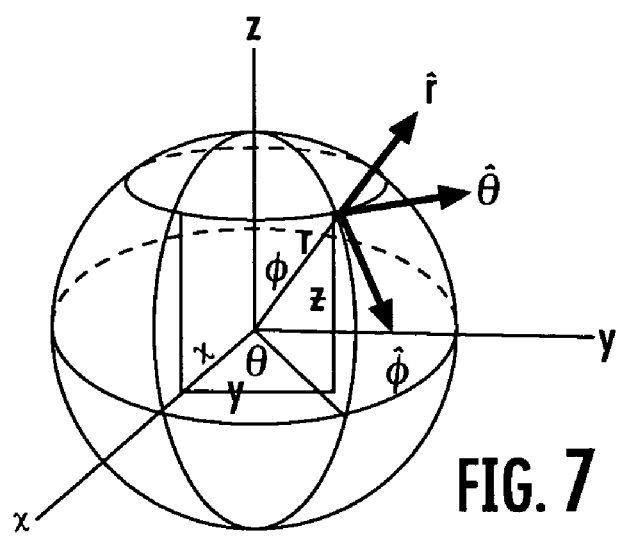
FIG. 7 is a 3-dimensional plot illustrating the use of tri-polarization in accordance with the present invention.

The following discussion supports the use of polarization for populating the mixing matrix A. The three differently polarized antenna elements 182a, 182b, 182c receive three linear and independent signals sums. The definitions and relationships of the x, y and z axis as illustrated in FIG. 7 will be used. For example, the following relationships exist:

$$x = S\cos(\theta)\sin(\phi)$$

$$y = S\sin(\theta)\sin(\phi)$$

$$z = S\cos(\theta)$$

Simplifying assumptions are that the signals have linear polarization, the signals are linearly independent, and there are three linear antenna elements each on an orthogonal axis. For example, antenna element 182a is on the x axis, antenna element 182b is on the y axis, and antenna element 182c is on the z axis.

By positioning the three linear antenna elements 182a, 182b, 182c each on an orthogonal axis, the mathematics is simplified. In an actual deployment, the antenna elements 182a, 182b, 182c need not be strictly orthogonal, nor do they need to meet at a common point. The removal of this assumption will not invalidate the general conclusion, but rather change the cases under which rank deficiency occurs.

The following definitions are applied, wherein numeric subscripts refer to associations with signals 1, 2, 3:

$S_1, S_2, S_3$: Signals incident to the antenna elements;

$\theta_1, \theta_2, \theta_3$: The X, Y plane E field angle of the signal;

$\phi_1, \phi_2, \phi_3$: The Z axis E field angle of the signal; and $X_x, X_y, X_z$: Dot product of the sum of signals incident to an antenna element.

Therefore, the vector components are:

|  | x | y | z |
|---|---|---|---|
| Element 'x': | 1 | 0 | 0 |
| Element 'y': | 0 | 1 | 0 |
| Element 'z': | 0 | 0 | 1 |
| $S_1$ Coefficient: | $\cos(\theta_1)\sin(\phi_1)$ | $\sin(\theta_1)\sin(\phi_1)$ | $\cos(\phi_1)$ |
| $S_2$ Coefficient: | $\cos(\theta_2)\sin(\phi_2)$ | $\sin(\theta_2)\sin(\phi_2)$ | $\cos(\phi_2)$ |
| $S_3$ Coefficient: | $\cos(\theta_3)\sin(\phi_3)$ | $\sin(\theta_3)\sin(\phi_3)$ | $\cos(\phi_3)$ |

Taking the dot product of each antenna element and signal, $(X \cdot Y = x_1 x_2 + y_1 y_2 + z_1 z_2)$ determines the relative E field component summed in the element. These values are used to create the mixing matrix:

$$\begin{bmatrix} X_x \\ X_y \\ X_z \end{bmatrix} = \begin{bmatrix} \cos(\theta_1)\sin(\phi_1) & \cos(\theta_2)\sin(\phi_2) & \cos(\theta_3)\sin(\phi_3) \\ \sin(\theta_1)\sin(\phi_1) & \sin(\theta_2)\sin(\phi_2) & \sin(\theta_3)\sin(\phi_3) \\ \cos(\phi_1) & \cos(\phi_2) & \cos(\phi_3) \end{bmatrix} \begin{bmatrix} S_1 \\ S_2 \\ S_3 \end{bmatrix}$$

where:

-continued $$det\begin{bmatrix} X_x \\ X_y \\ X_z \end{bmatrix} = \cos(\theta_1)\sin(\phi_1)\sin(\theta_2)\sin(\phi_2)\cos(\phi_3) +$$
$$\cos(\theta_2)\sin(\phi_2)\sin(\theta_3)\sin(\phi_3)\cos(\phi_1) +$$
$$\cos(\theta_3)\sin(\phi_3)\sin(\theta_1)\sin(\phi_1)\cos(\phi_2) -$$
$$\cos(\phi_1)\sin(\theta_2)\sin(\phi_2)\cos(\theta_3)\sin(\phi_3) -$$
$$\cos(\phi_2)\sin(\theta_3)\sin(\phi_3)\cos(\theta_1)\sin(\phi_1) -$$
$$\cos(\phi_3)\sin(\theta_1)\sin(\phi_1)\cos(\theta_2)\sin(\phi_2)$$
$$= \cos(\theta_1)\sin(\theta_2)\sin(\phi_1)\sin(\phi_2)\cos(\phi_3) +$$
$$\cos(\theta_2)\sin(\theta_3)\cos(\phi_1)\sin(\phi_2)\sin(\phi_3) +$$
$$\sin(\theta_1)\cos(\theta_3)\sin(\phi_1)\cos(\phi_2)\sin(\phi_3) -$$
$$\sin(\theta_2)\cos(\theta_3)\cos(\phi_1)\sin(\phi_2)\sin(\phi_3) -$$
$$\cos(\theta_1)\sin(\theta_3)\sin(\phi_1)\cos(\phi_2)\sin(\phi_3) -$$
$$\sin(\theta_1)\cos(\theta_2)\sin(\phi_1)\sin(\phi_2)\cos(\phi_3)$$
$$= \cos(\theta_1)\sin(\theta_2)\sin(\phi_1)\sin(\phi_2)\cos(\phi_3) -$$
$$\sin(\theta_1)\cos(\theta_2)\sin(\phi_1)\sin(\phi_2)\cos(\phi_3) +$$
$$\cos(\theta_2)\sin(\theta_3)\cos(\phi_1)\sin(\phi_2)\sin(\phi_3) -$$
$$\sin(\theta_2)\cos(\theta_3)\cos(\phi_1)\sin(\phi_2)\sin(\phi_3) +$$
$$\sin(\theta_1)\cos(\theta_3)\sin(\phi_1)\cos(\phi_2)\sin(\phi_3) -$$
$$\cos(\theta_1)\sin(\theta_3)\sin(\phi_1)\cos(\phi_2)\sin(\phi_3)$$
$$= \sin(\phi_1)\sin(\phi_2)\cos(\phi_3)[\cos(\theta_1)\sin(\theta_2) - \sin(\theta_1)\cos(\theta_2)] +$$
$$\cos(\phi_1)\sin(\phi_2)\sin(\phi_3)[\cos(\theta_2)\sin(\theta_3) - \sin(\theta_2)\cos(\theta_3)] +$$
$$\sin(\phi_1)\cos(\phi_2)\sin(\phi_3)[\sin(\theta_1)\cos(\theta_3) - \cos(\theta_1)\sin(\theta_3)]$$
$$= \sin(\phi_1)\sin(\phi_2)\cos(\phi_3)\sin(\theta_2 - \theta_1) +$$
$$\cos(\phi_1)\sin(\phi_2)\sin(\phi_3)\sin(\theta_3 - \theta_2) +$$
$$\sin(\phi_1)\cos(\phi_2)\sin(\phi_3)\sin(\theta_1 - \theta_3)$$

Rank deficiency situations will now be discussed. When the determinant is equal to 0, the mixing matrix is rank deficient. This occurs in the following cases:

1) $\theta_1 = \theta_2 = \theta_3$

The 'x' and 'y' elements are receiving the same contribution from all three signals.

| 2) | $\phi_1$ | $\phi_2$ | $\phi_3$ |
|---|---|---|---|
| | 0 | 0 | 0 |
| | 0 | 0 | 90° |
| | 0 | 90° | 0 |
| | 90° | 0 | 0 |
| | 90° | 90° | 90° |

Add 180 degrees to any combination of table entries for another rank deficient instance. These are occurrences when the signals are not being independently summed by a sufficient combination of antenna elements.

3) All the individual sums do not equal 0 per 1 or 2, but:

$$\sin(\phi_1)\sin(\phi_2)\cos(\phi_3)\sin(\theta_2-\theta_1)+\cos(\phi_1)\sin(\phi_2)\sin(\phi_3)$$
$$\sin(\theta_3-\theta_2)+\sin(\phi_1)\cos(\phi_2)\sin(\phi_3)\sin(\theta_1-\theta_3)=0$$

This implies a small solid angle of separation between the signals, near equal polarization of the signals, signals aligned but coming from opposite sides of the array, or some other very unlikely happenstance of signal incidence resulting in the same energy level to both elements.

As discussed above, the section of the roadmap addresses antenna configurations. The above described antenna configurations, including uncorrelated sensors, may be combined in a variety of different configurations for providing the summed signals of the M source signals to the mixing matrix.

Figure 8:
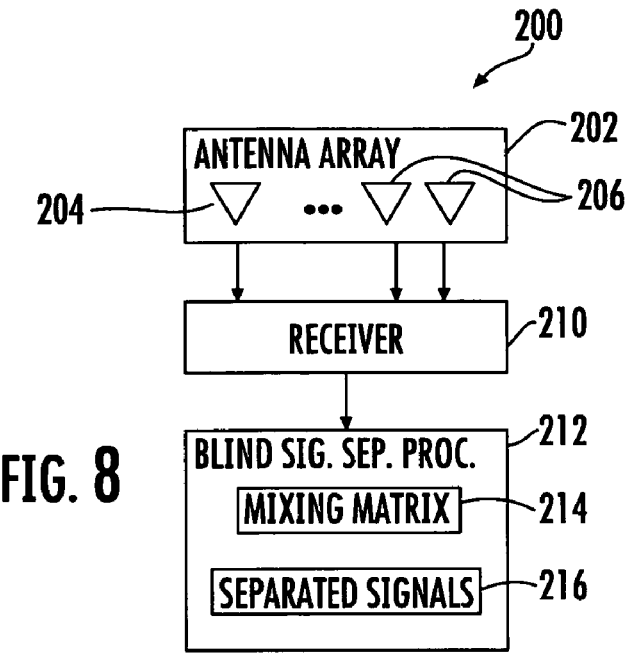
FIG. 8 is a block diagram of a communications device with an antenna array comprising correlated and uncorrelated antenna elements for providing different summations of signals for blind signal separation processing in accordance with the present invention.

Referring now to FIG. 8, a communications device 200 for separating source signals provided by M signal sources will be discussed. The antenna array 202 comprises N antenna elements for receiving at least N different summations of the M source signals, with N and M being greater than 1.

The N antenna elements comprises at least one antenna element 204 for receiving at least one of the N different summations of the M source signals, and at least two correlated antenna elements 206 for receiving at least two of the N different summations of the M source signals. The two correlated antenna elements 206 are uncorrelated with the antenna element 204. The antenna array may include additional antenna elements in various combinations in which the elements are correlated, uncorrelated and polarized.

A receiver 210 is connected to the antenna array 202 for receiving the at least N different summations of the M source signals. A blind signal separation processor 212 is connected to the receiver for forming a mixing matrix 214 comprising the at least N different summations of the M source signals. The mixing matrix has a rank equal up to at least N, and the blind signal separation processor 212 separates desired source signals 216 from the mixing matrix A.

The third section of the roadmap addresses enhancements to the antenna configurations provided in the second section. The enhancements are made so that additional or replacements summations of the source signals are collected to further populate the mixing matrix A.

One enhancement involves array deflection for receiving additional sums of signals for use by the mixing matrix A without having to add additional antenna elements. Array deflection involves controlling antenna patterns in the azimuth and/or elevation direction.

Figure 9:
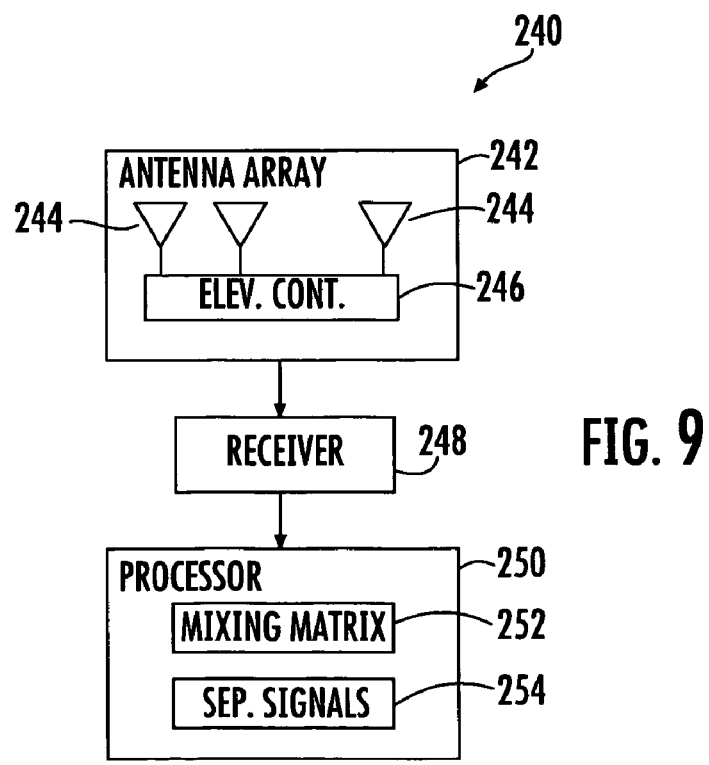
FIG. 9 is a block diagram of a communications device operating based on array deflection for providing different summations of signals for blind signal separation processing in accordance with the present invention.

A communications device 240 for separating source signals provided by M signal sources using array deflection will now be discussed in reference to FIG. 9. The antenna array 242 comprises N antenna elements 244 for generating N initial antenna patterns for receiving N different summations of the M source signals. The antenna array 242 also comprises an elevation controller 246 for selectively changing an elevation of at least one of the N initial antenna patterns for generating at least one additional antenna pattern so that at least one additional different summation of the M source signals is received thereby.

A receiver 248 is connected to the antenna array 242 and receives the N different summations of the M source signals using the N initial antenna patterns, and also receives the at least one additional different summation of the M source signals using the at least one additional antenna pattern.

A blind signal separation processor 250 is connected to the receiver 248 for forming a mixing matrix 252 comprising the N different summations of the M source signals and the at least one additional different summation of the M source signals. The mixing matrix has a rank equal to N plus the number of additional different summations of the M source signals received using the additional antenna patterns. The processor 250 separates desired signals 254 from the mixing matrix.

In general, any antenna array means which provides signal sums suitable for increasing the rank of the mixing matrix can be utilized with a deflection mechanism. The deflection will generate two distinct and mixing matrix usable signal sums for each of the antenna array means. There is therefore a 2 times multiplier effect by utilization of this technique.

If the array deflection is segmented into K distinct areas associated with an antenna, each of the K areas can provide for 2 independent deflection areas and entries into the mixing matrix. For instance, if the antenna array can provide N summations by itself and there are K distinct deflection areas, the number of signal sums in the mixing matrix may be 2*K*N.

Figure 10:
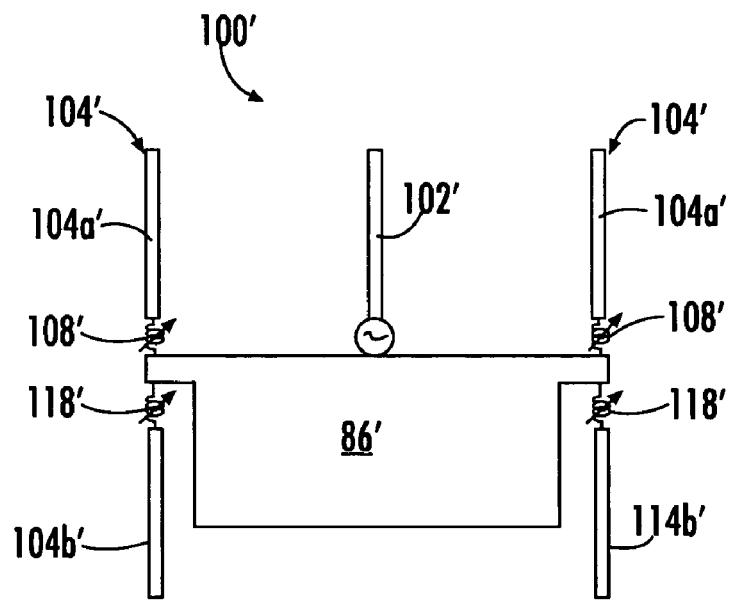
FIG. 10 is block diagram of a switched beam antenna with an elevation controller for selectively changing an elevation of an antenna pattern in accordance with the present invention.

For illustration purposes, reference is directed to FIG. 10 in which the switched beam antenna 100' shown in FIG. 4 has been modified so that the antenna patterns may be tilted up or down in elevation. In particular, each upper half 104a' of the passive antenna elements 104' is connected to the ground plane 106' through a reactive load 108'. Each lower half 104b' of the passive antenna elements 104' is also connected to the ground plane 106' through a reactive load 108'. A reactance on the passive antenna elements 104' has the effect of lengthening or shortening the passive antenna element. Inductive loads lengthen and capacitive loads shorten the electrical length of the passive antenna elements 104'.

Figure 11:
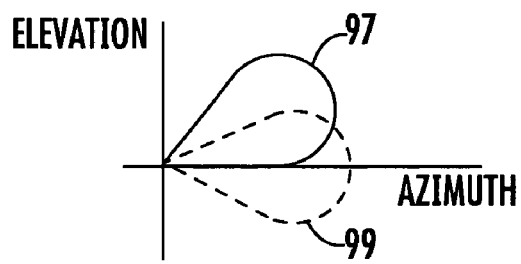
FIG. 11 is an antenna plot illustrating an antenna pattern in the azimuth direction and then rotated in the elevation direction in response to the elevation controller illustrated in FIG. 9.

An antenna beam is tilted up and down in elevation in accordance with the ratios of the reactive loads 108' of the upper halves 104a' and the reactive loads 118' of the lower halves 104b'. By adjusting the ratio, the antenna pattern can point up 97 or down 99, as illustrated in FIG. 11. At least one additional rank is added to the mixing matrix A when an elevation angle of an antenna pattern is adjusted to receive a mixed signal. Using the array deflection, more signals can be received for the mixing matrix A without having to increase the number of antenna elements N.

This particular implementation has 2 distinct deflection areas individually controlled by the reactances 118'. The pattern generation capability of the array is 3 independent patterns, therefore the number of signal sums that can be used to create the mixing matrix is 12 (2*2*3).

Reference is directed to the above reference U.S. patent application Ser. No. 11/065,752, which discloses how to adjust antenna beams in elevation in greater detail. The array deflection technique may be applied to any of the above discussed antenna array embodiments, or any other antenna array which is sensitive to ground plane interactions.

Figure 12:
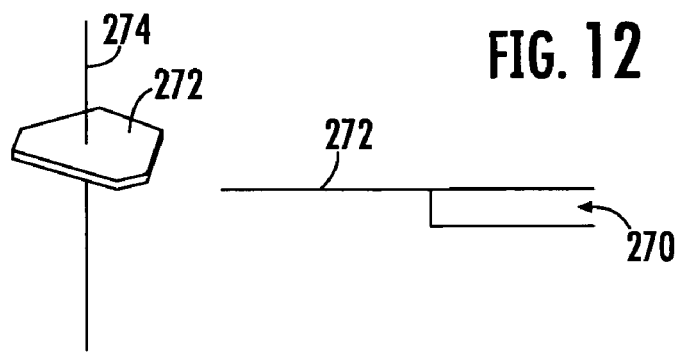
FIG. 12 is a block diagram of an antenna element with an RF choke formed in the ground plane for rotating the antenna pattern in the elevation direction accordance with the present invention.

Another embodiment of the elevation controller is based upon a controllable RF choke 270 coupled to the ground plane 272 of an antenna element 274, as illustrated in FIG. 12. The antenna pattern associated with the antenna element 274 is moved in elevation by controlling the RF choke 270, as readily appreciated by those skilled in the art.

A communications device 300 for separating source signals provided by M signal sources based on path selection will be discussed in reference to FIG. 13. This is another enhancement to the antenna configurations provided in the second section of the roadmap, as well as an enhancement to the array deflection discussed above. The communications device 300 comprises an antenna array 302 comprising N elements 304 for forming at least N antenna beams for receiving at least N different summations of the M source signals, with N and M being greater than 2.

A controller 306 is connected to the antenna array for selectively forming the at least N antenna beams. A receiver assembly 308 is connected to the antenna array 302 for receiving the at least N different summations of the M source signals. A blind signal separation processor 310 is connected to the receiver assembly 308 for forming a mixing matrix 312 comprising up to the at least N different summations of the M source signals.

The blind signal separation processor 310 also determines if the different summations of the M source signals are correlated or statistically independent, and if not, then cooperating with the controller 306 for forming different beams for receiving new different summations of the M source signals to replace the different summations of the M source signals that are not correlated or statistically independent in the mixing matrix 312. The desired source signals 314 are then separated from the mixing matrix 312.

A rake receiver is a radio receiver designed to counter the effects of multipath fading. It does this by using several independent receivers each delayed slightly in order to tune in to the individual multipath components. It can be used by most types of radio access networks. It has been found to be especially beneficial for spreading code types of modulation. Its ability to select specific incident signal paths make it suitable as a means to change the paths fed to the blind signal separation processing.

Selectively forming the N antenna beams as discussed above may be applied to all radio access networks, as readily understood by those skilled in the art. For CDMA systems, the receiver assembly 308 comprises N rake receivers 316. Each rake receiver 316 comprises k fingers for selecting k different multipath components for each one of the N different summations of the M source signals received by the respective antenna element connected thereto. In this configuration, the blind signal separation processor 310 is connected to the N rake receivers 316 for forming the mixing matrix 312. The mixing matrix 312 comprises up to at least kN different multipath components of the at least N different summations of the M source signals, and the mixing matrix has a rank equal up to kN.

In particular, when CDMA waveforms propagate they often encounter multiple paths from the source to the destination. A rake receiver 316 is specifically designed to capture a number of these individual instances and combine them for a more robust signal decoding. While the original signal propagates along each path, its properties are modified by the unique characteristics of the path. In some circumstances, the modification to the correlation and/or statistical properties of the received signal will be large enough so that they can be treated as separable signal streams. A modified rake receiver 316 could be used to extract each modified stream and feed it as a unique entry into the mixing matrix 312. While this means of increasing the rank will not always be available, it will tend to be available in high multipath environments when it is most likely needed.

Figure 13:
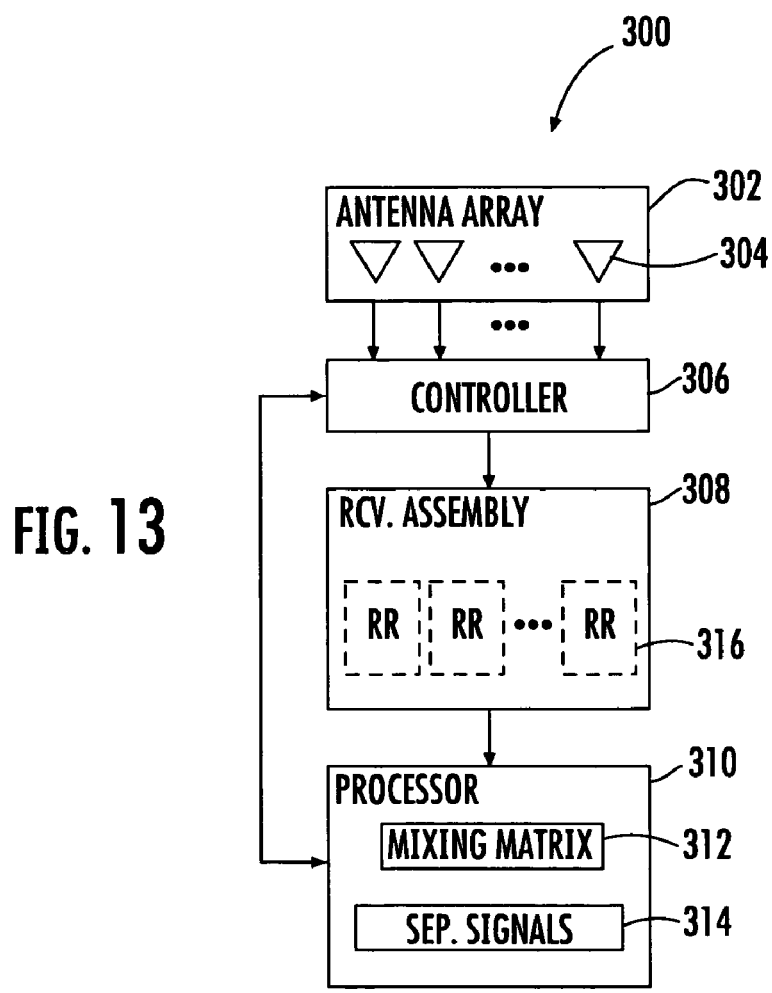
FIG. 13 is a block diagram of a communications device operating based on path selection for providing different summations of signals for blind signal separation processing in accordance with the present invention.

While a rake receiver 316 can exploit the different paths, the more general approach applicable to any modulation technique is beam forming, as discussed in reference to FIG. 13. This differs from the rake receiver 316 since beam forming is used for desired signal enhancement as well as desired signal rejection. The difference however is that the rejected signal may actually be another version of the signal intended for the receiver. However, the receiver assembly 308 needs to detect a number of these unique propagation path versions of the same signal in order to build the mixing matrix 312 to a sufficient rank.

The fourth section of the roadmap addresses signal splitting for further populating the mixing matrix A. In one approach, the summation signals are split using spreading codes. In another approach, the summation signals are split using in-phase (I) and quadrature (Q) modules.

Figure 14:
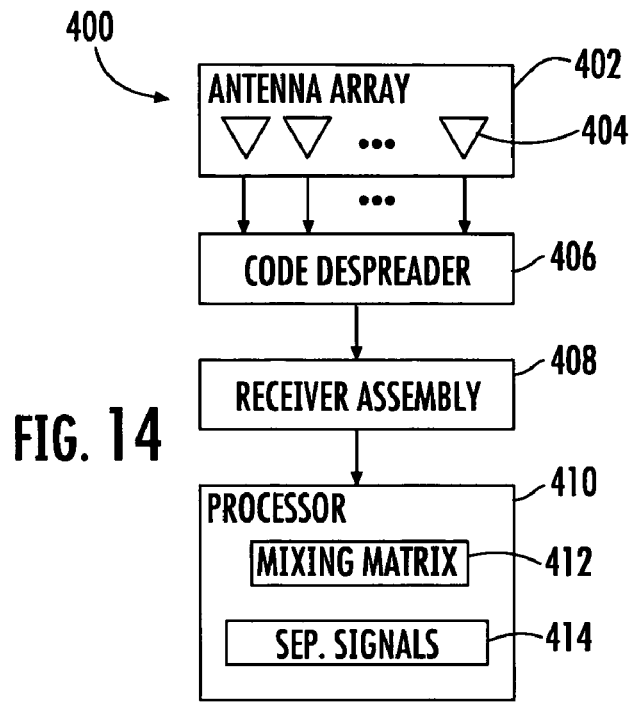
FIG. 14 is a block diagram of a communications device operating based on spreading codes for providing additional summations of signals for blind signal separation processing in accordance with the present invention.

Signal splitting using spreading codes will now be discussed in reference to FIG. 14. The illustrated communications device 400 comprises an antenna array 402 comprising N antenna elements 404 for receiving at least N different summations of the M source signals. A code despreader 406 is connected to the N antenna elements 404 for decoding the at least N different summations of the M source signals. Each one of the N different summations includes k codes for providing k different summations of the M source signals associated therewith.

A receiver assembly 408 is connected to the code despreader 406 for receiving at least kN different summations of the M source signals. A blind signal separation processor 410 is connected to the receiver assembly 408 for forming a mixing matrix 412 comprising the at least kN different summations of the M source signals. The mixing matrix 412 has a rank equal up to kN. The blind signal separation processor 410 separates desired source signals 414 from the mixing matrix 412.

Depending on the modulation of the received signals, the above described signal splitting may be used for increasing the rank of the mixing matrix A without increasing the number N of antenna elements. CDMA IS-95, CDMA2000 and WCDMA are examples of spread spectrum communications systems in which spreading codes are used. A common thread is that a unique code is processed with each signal to spread the data over a larger frequency band.

The same spreading code is processed with the received signal sum (desired signal, undesired signals and unknown noise sources). This causes the desired signal to be reconstructed back to its original frequency bandwidth, while the interferers are spread over the wide frequency band.

The above listed CDMA implementations actually have many signal streams simultaneously using the same frequency band. Each signal stream uses a code that is ideally orthogonal to all the others. If this condition is met at the decoder, it means that only the signal of interest will be despread. If the code of the Kth signal of the sum is used for dispreading, the resultant received signal sum $x_k$ will be mostly made up of an increased amplitude $s_k$ term and either unchanged or lower valued k−1 terms.

There often is some correlation between the CDMA signals, so the interfering signals are somewhat reconstructed along with the desired signal. This is often due to the delay experienced by the individual signals, and also the multipath occurrences of the signals. Some of the undesired signals, especially the CDMA ones, will increase in value. The increase will not be as significant as for the desired signal, but it will still increase the overall noise value, and therefore decrease the signal-to-noise ratio.

The form of the despread signals equation and the signals themselves meet the criteria for blind signal separation processing. In fact, if one of the dispreading codes is individually applied for each known signal received by the communications device 400, individual summations that meet the ICA model requirements are obtained.

Therefore, there are as many row entries available for the mixing matrix as known codes, assuming of course, that they each produce linearly independent significant value. Under the right circumstances this will allow an increase of the mixing matrix to a value greater than the number of codes. For example, N antenna elements and M codes may provide NM matrix rows.

For illustrative purposes, 3 codes are assumed known and the 3 known code signals retain their orthogonality. In the code despreader 406, the mixing matrix A has top 3 rows and bottom 3 rows each due to an antenna stream after each stream has been despread by the 3 known codes. The off diagonal 0 values are due to the orthogonality of the codes. The column entries 4, 5 and 6 are for the general case of unknown signals of the same index.

$$\begin{bmatrix} x_1 \\ x_2 \\ x_3 \\ x_4 \\ x_5 \\ x_6 \end{bmatrix} = \begin{bmatrix} a_{11} & 0 & 0 & a_{14} & a_{15} & a_{16} \\ 0 & a_{22} & 0 & a_{24} & a_{25} & a_{26} \\ 0 & 0 & a_{33} & a_{34} & a_{35} & a_{36} \\ a_{41} & 0 & 0 & a_{44} & a_{45} & a_{46} \\ 0 & a_{52} & 0 & a_{54} & a_{55} & a_{56} \\ 0 & 0 & a_{63} & a_{64} & a_{56} & a_{66} \end{bmatrix} \begin{bmatrix} s_1 \\ s_2 \\ s_3 \\ s_4 \\ s_5 \\ s_6 \end{bmatrix}$$

The signals corresponding to the column entries 4, 5 and 6 can be other path versions of the known codes, or other cell signals of unknown codes. Also, one signal may be Gaussian and the other signal is either CDMA signal groups obeying the central limit theorem so that they appear as a single Gaussian signal, e.g., release 4 channels. In other words, a sufficient amount of non-random signals will add up to a Gaussian signal. The interferers may be Non-Gaussian signal sources or at most one Gaussian signal unknown to the network.

After despreading the known codes in the code despreader 406, the blind signal separation processor 410 receives a mixing matrix 412 of rank 6. The rank of 6 is derived based upon 2 antenna elements multiplied by a factor of 3 since 3 codes are known.

The 6 signals are applied to the blind signal separation processor 410 wherein the mixing matrix 412 having a rank of 6 is formed. The blind signal separation processor 410 determines the separation matrix W from only the received signals modified by the channels: x=As. In the illustrated example, 6 signals are separable.

The blind signal separation processor 410 selects the signals to be decoded. For example, the interferer signals may be dropped and all versions of the desired signals are selected. The selected signals are applied to a demodulator module for demodulation. The demodulator uses well known equalization techniques that combine the multipath versions of the same signal.

In the more general case the off diagonal values shown as 0 above for simplicity, could actually be nonzero. This would be the more usual case when the correlation properties between the coded signals are not perfect. This would represent additional noise to each separated signal. However, as previously shown the rank of the matrix is sufficient to separate these signals, so their value will be significantly reduced after the blind signal separation processing. This leads to a decrease in noise, an increase in signal to noise ratio, and as indicated by Shannon's law an increase in channel capacity.

Figure 15:
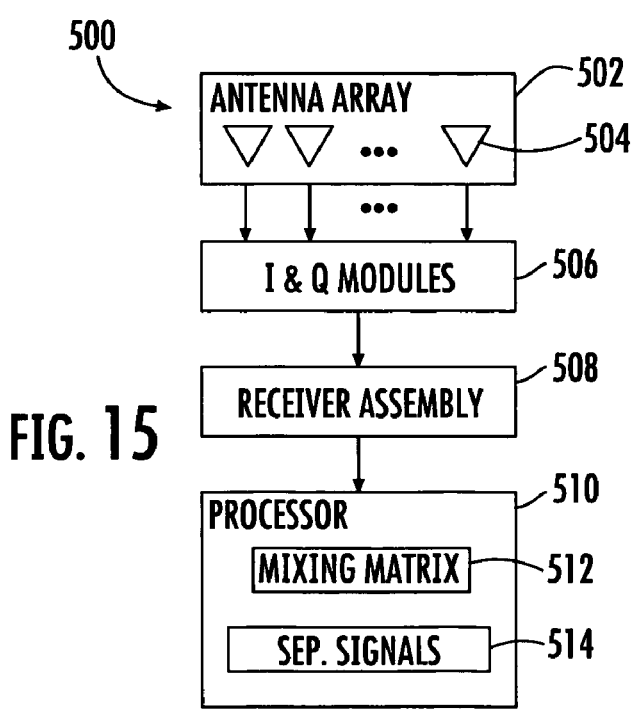
FIG. 15 is a block diagram of a communications device operating based on in-phase and quadrature signal components for providing additional summations of signals for blind signal separation processing in accordance with the present invention.

Referring now to FIG. 15, the other approach for increasing the rank of the mixing matrix A without increasing the number N of antenna elements is to separate a received mixed signal into its in-phase (I) and quadrature (Q) components. I and Q components of a coherent RF signal are components whose amplitudes are the same but whose phases are separated by 90 degrees.

The communications device 500 comprises an antenna array 502 comprising N antenna elements 504 for receiving at least N different summations of the M source signals. A respective in-phase and quadrature module 506 is downstream to each antenna element 504 for separating each one of the N different summations of the M source signals received thereby into an in-phase and quadrature component set.

A receiver assembly 508 is downstream to each in-phase and quadrature module 506 for receiving the at least N in-phase and quadrature component sets for the at least N different summations of the M source signals. A blind signal separation processor 510 is downstream to the receiver assembly 508 for forming a mixing matrix 512 comprising at least 2N different summations of the M source signals. Each in-phase and quadrature component set provides 2 inputs into the mixing matrix 512. The mixing matrix 512 has a rank equal up to 2N, and the blind signal separation processor 510 separates desired source signals 514 from the mixing matrix 512.

Figure 16:
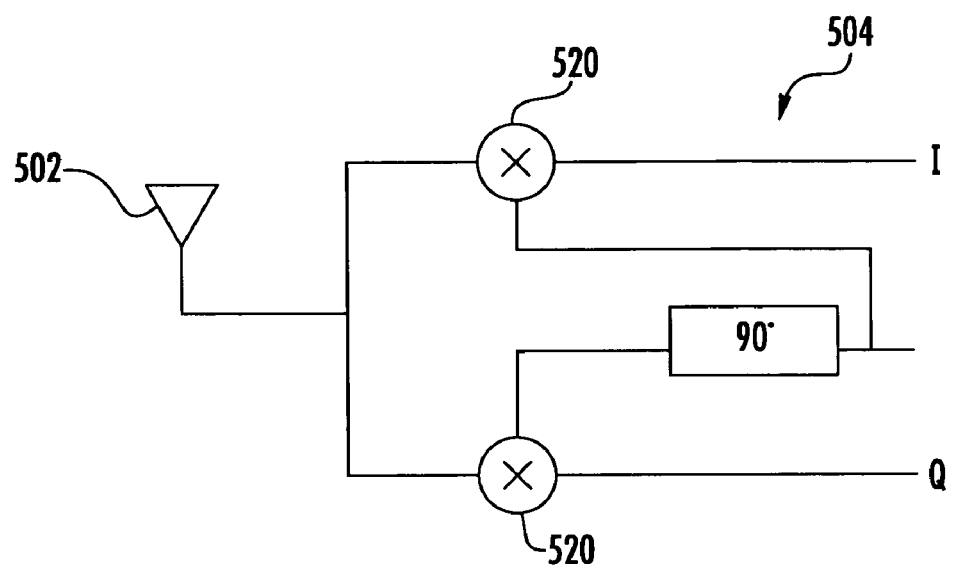
FIG. 16 is a more detailed block diagram of an in-phase and quadrature module connected to an antenna element as shown in FIG. 15.

One of the respective I and Q modules 506 downstream from an antenna element 502 is illustrated in FIG. 16. A mixed signal received at the antenna element 502 is split by a pair of mixers 520. I and Q components are commonly produced by translating an intermediate frequency (IF) signal to another frequency range with two synchronous detectors to which identical reference signals 90 degrees out of phase are applied. Together, the I and Q signals preserve the phase information contained in the IF signal, thereby enabling a signal having a positive frequency to be differentiated from one having a negative frequency.

By separating the received mixed signals into I and Q components, the size of the mixing matrix increases by a factor of 2. As long as the I and Q components are encoded with different data streams, then the mixed signal received at any antenna element may be split into two different mixed signals.

In the case of differential encoding the nature of the modulation needs to be analyzed to determine if I and Q meet the linearity requirement. For instance, it has been shown for GSM that the GMSK encoding can be assumed linear when used with appropriate filtering, and processed in the receiver as if it were BPSK encoding. Since BPSK meets the requirements for blind signal separation processing, the I and Q process described can be used.

I and Q components can be used with any of the above described antenna array embodiments to populate the mixing matrix A. When I and Q is used, the mixing matrix A can be populated as if 2 times the number of antenna elements were used. Another example could be the use of 2 antenna elements (a factor of 2) that are uncorrelated with unequal polarization (a factor of 2*2), and in combination with the I and Q components (a factor of 2*2*2) so that 8 independent mixed signal sums are generated.

This mechanism could also be used with the antenna array deflection technique to create more sums of signals. Each of these sums could in turn also be separated into I and Q components.

Another aspect of the invention is directed to undulating transmit patterns to support effective area coverage. Referring back to FIG. 3, this aspect of the invention corresponds to Block 92 in the transmitter processing section of the illustrated roadmap. Signals from external transmitters are interferers to signals from sites a device is trying to communicate with. This problem is mostly addressed by treating the external signals as random noise. As long as the signal to noise ratio remains above specific thresholds, the desired signal can be decoded. The problem is to design a communications system that down grades these problems, while utilizing the benefits of multiple communication paths to maximize the effectiveness communication link and the overall capacity of the system.

Figure 17:
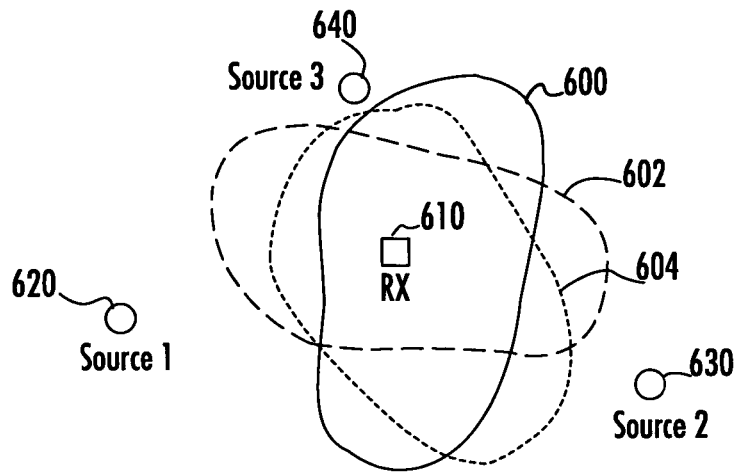
FIG. 17 is an illustration of a receiver receiving undulated transmit patterns in accordance with the present invention.
Figure 18:
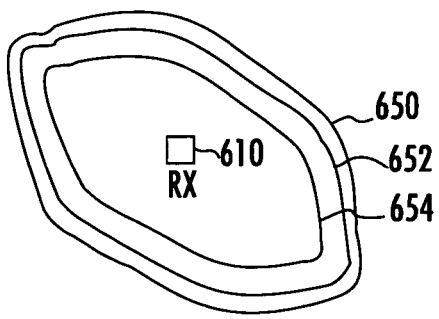
FIG. 18 is an illustration of a receiver receiving undulated transmit patterns that are scaled but not rotated in accordance with the present invention.

The term undulation as used herein refers to pattern contours 600, 602, 604 with varying gains, which may or may not display degrees of symmetry, as shown in FIG. 17. A receiver 610 is surrounded by three spaced apart fixed transmitters 620, 630, 640. A key point is that the pattern contours 600, 602, 604 should not be non-rotated change in scale versions of each other, as shown by pattern contours 650, 652, 654 in FIG. 18.

Figure 19:
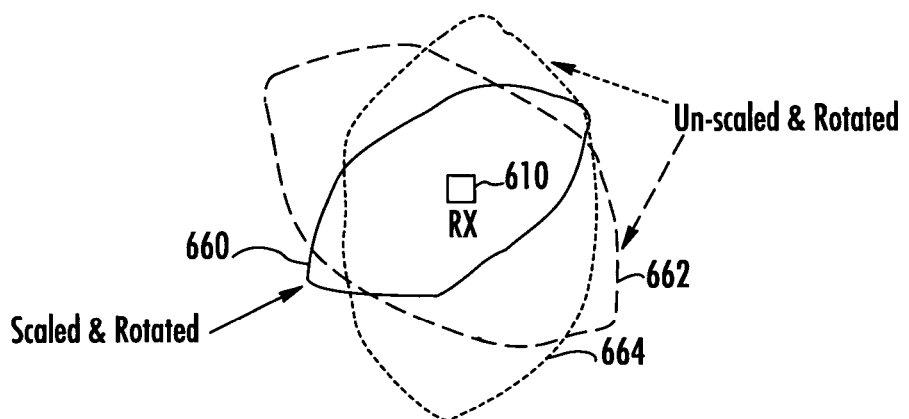
FIG. 19 is an illustration of a receiver receiving scaled and rotated undulated transmit patterns, and un-scaled and rotated undulated transmit patterns in accordance with the present invention.

Similar contours in geometry are useable, as long as they are rotations of each other. The three patterns contours 660, 662, 664 shown in FIG. 19 are all similar in geometry, and they are all usable because they have different gains in each direction. While similar pattern usage is explained, and in some implementations will be the easiest way to implement the patterns, the set of patterns need not be similar. All that is required is that the set members differ in gain in each direction of transmission or reception of a signal which serves as a channel path to the other end or ends of the communication link.

In general, one plane of signal gain contour is illustrated herein for ease of visualization. The referenced undulations can occur in azimuth, elevation or in both orientations, i.e., on the surface of a three-dimensional shape surrounding the antenna. Which and to what degree each dimensional direction is actually deformed and therefore used is a function of projected benefit and physical implementation limitations.

The basic concept is to use sectored coverage patterns at the infrastructure sites. The actual number of sectors utilized varies with capacity needs and related cost factors. For example, a base station may be divided into 3 sectors, with each sector being supported by a transmitter.

Implementations may vary from a single sector, to an arbitrarily large number. The sectors themselves may be subdivided in the azimuth or elevation, or azimuth and elevation planes. A key benefit of using sectoring is that it alleviates the need for tracking the device at the other end of the link as per the beam forming method. Leaving the coverage region of one sector for another is therefore reduced to a classical handoff situation.

The receiver typically generates the pattern changes suitable for BSS processing. In contrast, the transmitter utilizes techniques so that a suitable BSS decoder environment at least partially exists. In some implementations this will mean the receiver need not generate any undulating patterns. In other implementations, it means the number of undulating patterns is significantly reduced.

Figure 20:
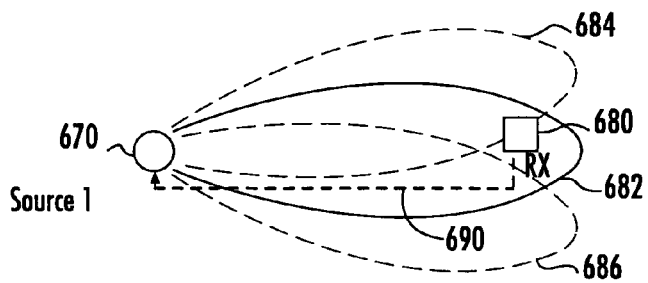
FIG. 20 is an illustration of a communications system in which linearly independent power level time periods are received by a receiver from a fixed transmission point at an infrastructure site in accordance with the present invention.
Figure 21:
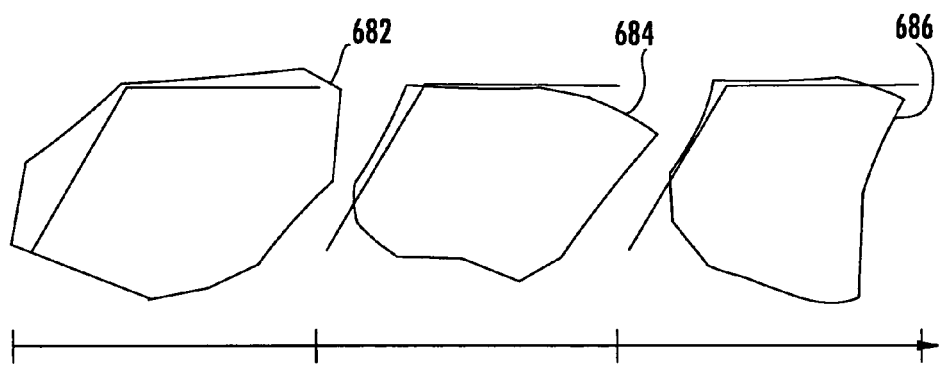
FIG. 21 is a plot of the transmit pattern contours shown in FIG. 20 being undulated in a timing sequence known to the receiver.

One embodiment is for one fixed transmission point 670 at an infrastructure site transmitting to a wireless mobile communications device 680, as shown in FIG. 20. This embodiment addresses the situation when it is unknown whether other transmission sources in the region are also operating. The transmit pattern contours 682, 684, 686 may be undulated in a timing sequencing know to the receiver 680, as shown in FIG. 21.

The changes in the transmit pattern may be timed to coincide with divisions of the transmit symbol. Instead of bore sight movement, the contour of the pattern is changed and held constant for each time slot. The coverage area therefore does not significantly change, and there is no foresight tracking issue to contend with.

The receiver will experience a change in wave front power level due to the changing transmission contours. The BSS matrix will therefore be populated with the differences of the various signal streams at different relative gain values.

More particularly, the fixed transmitter 670 transmits a source signal defined by a character set comprising a plurality of symbols, and at least one of the symbols in the character set is transmitted at a different power level so that the transmitted source signal appears with L linearly independent power level time periods, where $L \geq 2$. The amplitude of each symbol in the character set may be constant, with at least two of the symbols being at different power levels, for example.

While undulation covers all variations on the power contour of a sector, a simplified implementation would have the overall power level of the sector change. The radiated pattern would therefore remain the same in the mathematical sense of the word similar.

While all sectors of a specific base station could apply transmitter undulations as discussed above, in some circumstances it would be better to have only some subset do so, or apportion the degree of undulation amongst the sectors. For instance, if the receiver received a robust signal from sector A, but a weak signal from sector B, it would be preferable to undulate the robust signal from sector A, and leave the weak signal from B at its higher level. This implementation would actually be somewhat independent from which signal was the desired one and which was the interferer. For instance, the interferer might actually be the robust signal, but its level cannot be reduced significantly due to the fact a minimum level is necessary for it to communicate with some other device.

If the received dominant signals are all from one or more transmitters using the undulating signaling, the receiver merely takes samples during each pattern change, and uses the resulting data to populate the matrix for BSS processing.

If there is a mix of transmitters using the undulating signaling and others are not using it, the receiver can use classical signal separation techniques to account for them. Methods such as beam forming and multi-user detection may be used, for instance. However, the BSS method will usually be more robust. When practical, the receiver can implement pattern deformation and generate enough additional patterns to increase the rank of the BSS matrix above the number of signals to be separated.

For the BSS decoder implementation for example, if three transmit pattern contours 682, 684, 686 with three signals are sent by the transmitter 670 and there are two other signals being received, the receiver 680 would need to generate at least two contours to separate the interferers against each other. This is three contours less than would have been needed if the transmitter 670 were not generating its own set, so the implementation burden on the receiver 680 is always reduced.

If a transmitter 670 is sending a single stream along a signal path, the pattern contour set need not be rotated or dissimilar. This is because the signal as detected at the receiver 680 is being changed relative to all other received signals. The transmitter 670 may therefore use a simple power change for the overall pattern rather than needing to change the shape of the contour. If only one other stream is summed at the receiver 680, BSS processing will be able to separate them even though one is constant in amplitude. This is because the power dithering source provides the changes necessary for its operation. If more than one other stream is received, they appear as a single grouped interferer to the BSS processing, unless the receiver 680 itself uses other separation means, or has its own undulating pattern generation capability. While this scenario will sometimes occur, it is not always practical or the most reliable.

A pattern transmitter in the receive mode may be used. Since BSS processing of multiple pattern contours is an excellent method for signal separation, the same techniques used to generate the transmit patterns can also be used to generate multiple receiver values. The only cost factor for BSS reception when transmission is already supported, is therefore the BSS processing overhead.

User equipment receiver 680 feedback 690 to the transmitter 670 may also be used. While not strictly necessary, feedback information from the user equipment receiver 680 can be used to improve the overall operation of the links. For instance, the receiver 680 can determine the degree to which each change in pattern contour provides useful data. This information is fed back to the transmitter 670. The transmitter 670 can then adjust its operation to improve the link, utilize less power, or cause less interference to other communication links. Some of the adjustments could be: which and in what sequence each pattern is used, and how many changes are made during the course of a symbol transmission (i.e., change from M to N contours). Adjustments in contour changes per symbol will need to be conveyed to the receiver for best performance.

As readily understood by those skilled in the art, a source signal transmitted by the transmitter 670 is defined by a character set comprising a plurality of symbols, and at least one of the symbols in the character set is transmitted at a different power level so that the transmitted source signal appears with L linearly independent power level time periods, where $L \geq 2$.

While changing per symbol will be practical in some applications, it will often be more robust to make changes on a symbol or multiple symbol basis. This is because changing the power level during a symbol may have unacceptable changes in the symbol itself. Since the signal separation matrices are normally derived from a number of symbols, this is an acceptable implementation from a receiver processing viewpoint.

Another embodiment involves multiple transmission points that are known to be using the above-described approach. Each transmitter is capable of different transmit power levels. As an example, transmitter $L_1$ and transmitter $L_2$ are capable of L=3 power levels. The power levels are such that all the possible relative power level combinations are unique as inputs to the mixing matrix. The maximum number of linearly independent sums would therefore be $L_1 * L_2 = 3*3 = 9$. This extends to J transmitters as the maximum number of unique relative power levels=$L_1 * \ldots * L_J$.

The rank of the mixing matrix can exceed the number of sources to be separated when there are in fact more sources in the sums than the receiver cares about. If this is not the case the matrix will be degenerative, and the rank will collapse to the number of actual sources.

The receiver operation for the multi-transmitter site implementation is basically the same as for the single site. The difference is that the patterns generated by each transmitter can be counted at the receiver for BSS processing.

More robust operation however may be obtained by receiving information from the network as to the nature of the coordinated transmission parameters. For instance, the rank of the matrix, which in turn dictates the number of required patterns, can be adjusted. The receiver's generation of patterns, when available, is therefore adjusted per this information. Network wide radio resource management can utilize information fed back the user equipment to establish network wide pattern usage, orientations, power levels and timing.

All the methods discussed above for building the mixing matrix may be used as part of this implementation.

Another aspect of the invention is directed to undulating transmit patterns to support multiple simultaneous transmitters. Again referring back to FIG. 3, this aspect of the invention corresponds to Block 90 in the transmitter processing section of the illustrated roadmap. Communications capacity is an ongoing problem in RF wireless networks. The problem is basically due to RE frequency bands being limited resources. There are various techniques utilized to exploit these limited allocations to maximize capacity, but the demand in congested areas often exceeds the available capacity.

Figure 22:
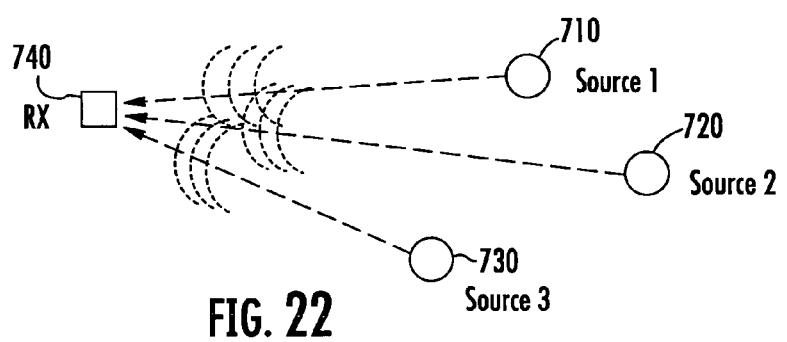
FIG. 22 is a block diagram of a communications system in which undulating patterns are used to support multiple transmitters transmitting to the same access point in accordance with the present invention.

Referring now to FIG. 22, multiple mobile wireless communications devices 710, 720, 730 transmitting to a fixed access point 740 modulate their RE patterns. The intended access point 740 and unintended access points will therefore receive different power level versions of the transmitted signals. This provides the information necessary for the intended access point 740 to populate the mixing matrix for signal separation techniques.

Still referring to FIG. 22, there are at least J mobile wireless communications devices 710, 720, 730 transmitting at a same timer where $J \geq 1$. Each mobile wireless communications device transmits a source signal defined by a respective character set comprising a plurality of symbols. At least one of the symbols in the respective character set is transmitted at a different power level so that the transmitted source signals from the J mobile wireless communications devices appear with at least $L_1$ to $L_J$ linearly independent power level time periods, where $L_j \geq 1$ and at least one $L_j > 1$.

The intended access point 740, which may be a fixed communications device, separates the source signals provided by M signal sources, where $M \geq 2$. The J mobile wireless communications devices 710, 720, 730 provide J of the M source signals including up to $(L_1^* \ldots {}^*L_J)$ linearly independent power level time periods.

As noted above, $(L_1^* \ldots {}^*L_J)$ linearly independent power level time periods occurs when the power levels are different for the J mobile wireless communications devices 710, 720, 730. The maximum number of unique relative power levels is $(L_1^* \ldots {}^*L_J)$, and therefore, the rank of the mixing matrix can exceed the number of sources to be separated when there are in fact more sources in the sums than the receiver cares about. If this is not the case the matrix will be degenerative, and the rank will collapse to the number of actual sources.

The modulation can be as simple as changing the transmitted power. This can be done independent of the pattern's contour, so omni-directional, sectored, or even beam formed patterns can be used. Other techniques such as changing the bore sight of a transmission beam can also be used.

A particularly effective approach is to have the transmitters use aligned time slots as discussed above. The timing can be set by using internal clocks in the devices, or synching up to a common time mark sent by the intended access point 740. If there is misalignment as to when the signals arrived at the receiver, there is a degradation in the BSS processing ability to separate the signals. Alignment can be adjusted by determining the distances to the devices, or measuring the time delay. Timing advance or retardation techniques can then be used by the accessing devices.

Given that the signal received gain changes are both being used by BSS processing equipped access points which consider them targets and in other cases interferers, the proper receiver to align with may vary. If there is no overall network coordination, the intended receiver should be aligned. If there is overall network coordination, measurements may show that the best approach is to make the signal easier to remove as an interferer, while still providing adequate alignment for separation at the intended receiver.

If there are other signal sources which do not use the RF power level modulation technique, classical signal rejection techniques can be used. Alternately, the receiver may use patterns or other means to increase the rank of the BSS suitable matrix. Even if the latter means are utilized, the degree of the matrix information derived will greatly reduce the overhead to implement at the access point receiver.

All the methods discussed above for building the mixing matrix at the intended access point 740 may be used as part of this implementation.

Another aspect of the invention is directed to BSS processing and pattern undulation to aid CDMA signal separation. This enhancement to transmitter processing is applicable to both Blocks 90 and 92 in the roadmap illustrated in FIG. 3. Code division multiple access systems (e.g., CDMA IS-95, CDMA2000, WCDMA) share the same allocated RF spectrum amongst multiple users. This is done by using pseudo random codes to select the various transmission signals at each chip (i.e., time period of usage) occurrence. In the ideal situation the code used by each link is orthogonal to all other codes, which facilitates multiple links using the same frequency. These individual signals are then recovered at the receiver through knowing the orthogonal code assigned to an individual link assuming orthogonality is maintained in the receive signal.

The signal being transmitted by a transmitter is a spread spectrum source signal defined by symbols, where each symbol comprises a plurality of chips based upon a spreading code. A portion of the chips within each symbol is transmitted at different power levels so that the transmitted source signal appears with L linearly independent power level time periods, where $L \geq 2$. A mobile wireless communications device is used to separate the source signals provided by M signal sources, where $M \geq 2$, and with the transmitter providing one of the M source signals with the L linearly independent power level time periods, as discussed above.

The mixing matrix formed by a signal separation processor forms a mixing matrix comprising the at least N different summations of the M source signals. The mixing matrix has a rank equal up to at least L*N. A number of the portions of chips being transmitted at different power levels within each symbol may be equal to the rank of the mixing matrix. Each portion of chips being transmitted at different power levels within each symbol may comprise a set of contiguous chips.

The ideal situation, however, breaks down in three scenarios. One is when orthogonality is lost or diminished due to differing path delays for the individual rays received by the receiver. A second is when the user equipment is in a soft handoff region between two adjacent cells or sectors. A third is when time slotted links are sharing resources with other user data channels such as in FDD HSDPA and CDMA2000 1xEV-DV. During these situations the orthogonality of the codes is often inadequate and diminished. This results in greatly reduced data rates and may even result in dropped links.

For a BSS algorithm to effectively separate the signals, the $x_i$ receive signal must be an aggregate of the signals received at the antenna with relatively different weighting factors associated with each individual signal. This can be done at the transmitter, the receiver, or both positions. Whether the weighting factors are changed at the transmission end or the reception end, they can be changed per chip or set of contiguous chips. The basic requirement is that the aggregate signal be adjusted per symbol at least as many times as there are signals to separate.

Figure 23:
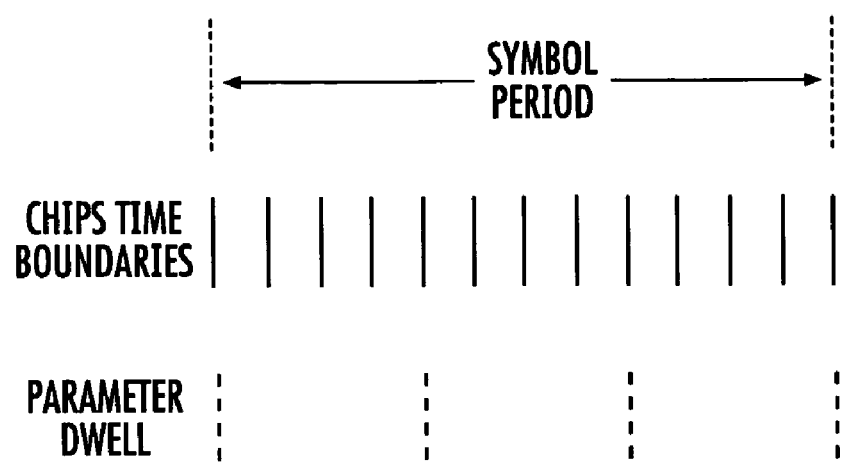
FIG. 23 is a time line in which a symbol period has 12 variations (i.e., 12 chips) while the parameter being varied is held constant for 4 sequential chips in accordance with the present invention.

FIG. 23 shows a case where in frequency the symbol is varied 12 times (12 chips). The parameter being varied is held constant for 4 chips. Three variations per symbol implies that three distinct signals can be separated from the aggregate received signal.

If a transmitter is sending a single stream along a signal path, the pattern contour set need not be rotational or dissimilar. This is because the signal as detected at the receiver is being changed relative all other received signals. The transmitter may therefore use a simple power change for the overall pattern rather than needing to change the shape of the contour. If only one other stream is summed at the receiver, BSS processing will be able to separate them even though one is constant in amplitude. This is because the power dithering source provides the changes necessary for its operation. If more than one other stream is received, they appear as a single grouped interferer to the BSS processor, unless the receiver itself uses other separation means, or has its own undulating pattern generation capability.

While not strictly necessary, feedback information from the user equipment receiver can be used to improve the overall operation of the links. For instance, the receiver can determine the degree to which each change in pattern contour provides useful data. This information is fed back to the transmitter. The transmitter can then adjust its operation to improve the link, utilize less power, or cause less interference to other communication links. While there are many ways of changing the power profiles, some of the adjustments could be which and in what sequence each pattern is used; how many changes are made during the course of a symbol transmission; and how to modulate or dither the power to an individual link. Adjustments in contour changes per symbol will need to be conveyed to the receiver for best performance.

Practical power amplifiers are best utilized in their linear operational range. With a large peak to average power ratio, the operational range for linear operation is reduced resulting in a reduced linear dynamic control range for the PA, and hence a reduced operational distance between transmitter and receiver. When power is the transmit parameter being utilized, this concern can be mitigated by several approaches.

These approaches include when more than one sink is being powered by the same amplifier, the BSS processing changes can be synchronized in a fashion such that the sum of the powers of all signals remains constant. In other words the increase of some transmissions is offset by the decrease of others. If the power is modulated at a value close to the chip rate, the excess power can often be absorbed by the decoupling storage elements with minor ripple induced. Excess power can be diverted to a dissipation load.

The patterns in two or three dimensions may be created by a number of means for both the transmit and the receive antennas, including adjustment of the delay and power level of phase array antennas; parasitic antenna elements with switchable loads; changes in polarization; changes in power plane loading which cause deflection of the patterns; mechanical movement of elements or reflectors; and a combination of any of the above.

All the methods discussed above for building the mixing matrix may be used as part of this implementation.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A communications system comprising:
    at least J mobile wireless communications devices transmitting at a same time, where $J \geq 2$, and each mobile wireless communications device transmitting a source signal defined by a respective character set comprising a plurality of symbols, and at least one of the symbols in the respective character set being transmitted at a different power level so that the transmitted source signals from said at least J mobile wireless communications devices appear with at least $L_1$ to $L_J$ linearly independent power level time periods, where $L_j \geq 1$ and at least one $L_j > 1$; and
    a fixed communications device for separating source signals provided by M signal sources, where $M \geq 2$, and with said J mobile wireless communications devices providing J of the M source signals including up to $(L_1 * \ldots * L_J)$ linearly independent power level time periods, said fixed communications device comprising
        an antenna array comprising N antenna elements for receiving at least N different summations of the M source signals, where $N \geq 1$,
        a receiver coupled to said antenna array for receiving the at least N different summations of the M source signals, and
        a signal separation processor coupled to said receiver for forming a mixing matrix comprising the at least N different summations of the M source signals, the mixing matrix having a rank equal to or greater than $(L_1 * \ldots * L_J)*N$, said signal separation processor for separating desired source signals from the mixing matrix.

2. A communications system according to claim 1 wherein said at least J mobile wireless communications devices use time aligned slots for transmitting the source signals.

3. A communications system according to claim 2 wherein said at least J mobile wireless communications devices each comprise an internal clock for setting their own timing to correspond with the time aligned slots.

4. A communications system according to claim 2 wherein said fixed communications device comprises a transmitter for transmitting a synch signal so that said at least J mobile wireless communications devices can set their own timing to correspond with the time aligned slots.

5. A communications system according to claim 1 wherein for each mobile wireless communications device, the amplitude of each symbol in the character set is constant, with at least two of the symbols being at different power levels.

6. A communications system according to claim 1 wherein said fixed communications device is part of a base station so that the communications system is configured as a cellular network.

7. A communications system according to claim 1 wherein each mobile wireless communications device comprises a receiver; and wherein said fixed communications device further comprises a fixed transmitter for providing feedback to each mobile wireless communications device via said receivers on transmission of the at least one symbol in the respective character sets at the different power levels.

8. A communications system according to claim 7 wherein the feedback comprises at least one of adjustment of the power level, and a sequence of the symbols within character sets being transmitted at the different power level.

9. A communications system according to claim 1 wherein said N antenna elements comprise N correlated antenna elements.

10. A communications system according to claim 9 wherein said N correlated antenna elements comprise N active antenna elements so that said antenna array forms a phased array.

11. A communications system according to claim 9 wherein said N correlated antenna elements comprise at least one active antenna element, and up to N−1 passive antenna elements so that said antenna array forms independent sums of incident signals.

12. A communications system according to claim 1 wherein at least two of said N antenna elements are correlated and have different polarizations for receiving at least two of the N different summations of the M source signals.

13. A communications system according to claim 1 wherein said fixed communications device further comprises a respective in-phase and quadrature module coupled between each antenna element and said receiver for separating each one of the N different summations of the M source signals received thereby into an in-phase and quadrature component set;
   said receiver receiving the at least N in-phase and quadrature component sets for the at least N different summations of the M source signals; and
   said signal separation processor forming the mixing matrix comprising at least 2*L*N different summations of the M source signals, with each in-phase and quadrature component set providing 2 inputs into the mixing matrix for each of the L linearly independent power level time periods, and with the mixing matrix having a rank equal to or greater than 2*L*N.

14. A communications system according to claim 1 wherein said wireless communications device further comprises a code despreader coupled between said N antenna elements and said receiver for decoding the at least N different summations of the M source signals, each one of the N different summations including k codes for providing k different summations of the M source signals with L linearly independent power level time periods associated therewith;
   said receiver receiving at least k*L*N different summations of the M source signals; and
   said signal separation processor forming the mixing matrix comprising the at least k*L*N different summations of the M source signals, the mixing matrix having a rank equal to or greater than k*L*N.

15. A communications system according to claim 1 wherein said antenna array generates N initial antenna patterns, said antenna array comprising an elevation controller for selectively changing an elevation of at least one of the N initial antenna patterns for generating at least one additional antenna pattern so that at least one additional different summation of the M source signals is received thereby;
   said receiver receiving the N different summations of the M source signals using the N initial antenna patterns, and receiving the at least one additional different summation of the M source signals using the at least one additional antenna pattern;
   said signal separation processor forming the mixing matrix comprising the N different summations of the M source signals and the at least one additional different summation of the M source signals, for each of the L linearly independent power level time periods, the mixing matrix having the rank equal to or greater than L*N plus the number of additional different summations of the M source signals times the L linearly independent power level time periods using the additional antenna patterns.

16. A communications system according to claim 1 wherein said signal separation processor comprises a blind signal separation processor, and separates the desired source signals from the mixing matrix based on at least one of principal component analysis (PCA), independent component analysis (ICA), and single value decomposition (SVD).

17. A communications system according to claim 1 wherein said signal separation processor separates the desired source signals from the mixing matrix based on a knowledge based processing signal extraction process.

18. A communications system according to claim 1 wherein said signal separation processor separates the desired source signals from the mixing matrix based on a combination of a knowledge based signal extraction process and a blind signal separation process.

19. A method for operating a communications system comprising:
   transmitting at a same time at least J source signals from at least J mobile wireless communications, where $J \geq 2$, and each mobile wireless communications device transmitting a source signal defined by a respective character set comprising a plurality of symbols, and at least one of the symbols in the respective character set being transmitted at a different power level so that the transmitted source signals from the J mobile wireless communications devices appear with at least $L_1$ to $L_J$ linearly independent power level time periods, where $L_j \geq 1$ and at least one $L_j > 1$; and
   separating at a fixed communications device source signals provided by M signal sources, where $M \geq 2$, with the J mobile wireless communications devices providing J of the M source signals including up to ($L_1$* ... *$L_J$) linearly independent power level time periods, the separating comprising
      receiving at least N different summations of the M source signals at an antenna array, where $N \geq 1$,
      providing the at least N different summations of the M source signals to a receiver coupled to the antenna array, and
      forming a mixing matrix comprising the at least N different summations of the M source signals, the mixing matrix having a rank equal to or greater than ($L_1$* ... *$L_J$)*N, and using a signal separation processor for separating desired source signals from the mixing matrix.

20. A method according to claim 19 wherein the at least J mobile wireless communications devices use time aligned slots for transmitting the source signals.

21. A method according to claim 20 wherein the at least J mobile wireless communications devices each comprise an internal clock for setting their own timing to correspond with the time aligned slots.

22. A method according to claim 20 wherein the fixed communications device comprises a transmitter for transmitting a synch signal so that the at least J mobile wireless communications devices can set their own timing to correspond with the time aligned slots.

23. A method according to claim 19 wherein for each mobile wireless communications device, the amplitude of each symbol in the character set is constant, with at least two of the symbols being at different power levels.

24. A method according to claim 19 wherein the fixed communications device is part of a base station so that the communications system is configured as a cellular network.

25. A method according to claim 19 wherein each mobile wireless communications device comprises a receiver; and wherein the fixed communications device further comprises a fixed transmitter for providing feedback to each mobile wireless communications device via the receivers on transmission of the at least one symbol in the respective character sets at the different power levels.

26. A method according to claim 25 wherein the feedback comprises at least one of adjustment of the power level, and a sequence of the symbols within character sets being transmitted at the different power level.

27. A method according to claim 19 wherein the N antenna elements comprise N correlated antenna elements.

28. A method according to claim 27 wherein the N correlated antenna elements comprise N active antenna elements so that the antenna array forms a phased array.

29. A method according to claim 27 wherein the N correlated antenna elements comprise at least one active antenna element, and up to N−1 passive antenna elements so that the antenna array forms independent sums of incident signals.

30. A method according to claim 19 wherein at least two of the N antenna elements are correlated and have different polarizations for receiving at least two of the N different summations of the M source signals.

31. A method according to claim 19 wherein the fixed communications device further comprises a respective in-phase and quadrature module coupled between each antenna element and the receiver for separating each one of the N different summations of the M source signals received thereby into an in-phase and quadrature component set;
   the receiver receiving the at least N in-phase and quadrature component sets for the at least N different summations of the M source signals; and
   the signal separation processor forming the mixing matrix comprising at least 2*L*N different summations of the M source signals, with each in-phase and quadrature component set providing 2 inputs into the mixing matrix for each of the L linearly independent power level time periods, and with the mixing matrix having a rank equal to or greater than 2*L*N.

32. A method according to claim 19 wherein the wireless communications device further comprises a code despreader coupled between the N antenna elements and the receiver for decoding the at least N different summations of the M source signals, each one of the N different summations including k codes for providing k different summations of the M source signals with L linearly independent power level time periods associated therewith;
   the receiver receiving at least k*L*N different summations of the M source signals; and
   the signal separation processor forming the mixing matrix comprising the at least k*L*N different summations of the M source signals, the mixing matrix having a rank equal to or greater than k*L*N.

33. A method according to claim 19 wherein the antenna array generates N initial antenna patterns, the antenna array comprising an elevation controller for selectively changing an elevation of at least one of the N initial antenna patterns for generating at least one additional antenna pattern so that at least one additional different summation of the M source signals is received thereby;
   the receiver receiving the N different summations of the M source signals using the N initial antenna patterns, and receiving the at least one additional different summation of the M source signals using the at least one additional antenna pattern;
   the signal separation processor forming the mixing matrix comprising the N different summations of the M source signals and the at least one additional different summation of the M source signals, for each of the L linearly independent power level time periods, the mixing matrix having the rank equal up to or greater than L*N plus the number of additional different summations of the M source signals times the L linearly independent power level time periods using the additional antenna patterns.

34. A method according to claim 19 wherein the signal separation processor comprises a blind signal separation processor, and separates the desired source signals from the mixing matrix based on at least one of principal component analysis (PCA), independent component analysis (ICA), and single value decomposition (SVD).

35. A method system according to claim 19 wherein the signal separation processor separates the desired source signals from the mixing matrix based on a knowledge based processing signal extraction process.

36. A method according to claim 19 wherein the signal separation processor separates the desired source signals from the mixing matrix based on a combination of a knowledge based signal extraction process and a blind signal separation process.

* * * * *

UNITED STATES PATENT AND TRADEMARK OFFICE
CERTIFICATE OF CORRECTION

PATENT NO. : 7,683,834 B2
APPLICATION NO. : 11/612818
DATED : March 23, 2010
INVENTOR(S) : Goldberg It is certified that error appears in the above-identified patent and that said Letters Patent is hereby corrected as shown below:

| | |
|---|---|
| Column 6, Line 41 | Delete: "As"<br>Insert: -- as -- |
| Column 6, Line 63 | Delete: "3G"<br>Insert: -- 30 -- |
| Column 7, Line 40 | Delete: "form"<br>Insert: -- from -- |
| Column 18, Line 9 | Delete: "a56"<br>Insert: -- a65 -- |
| Column 23, Line 3 | Delete: "RE"<br>Insert: -- RF -- |
| Column 23, Line 11 | Delete: "timer"<br>Insert: -- time -- |

Signed and Sealed this

Seventh Day of September, 2010

David J. Kappos
*Director of the United States Patent and Trademark Office*